United States Patent
Ezell

(10) Patent No.: US 12,200,169 B2
(45) Date of Patent: Jan. 14, 2025

(54) AI BASED HOLD MESSAGING

(71) Applicant: LIVEPERSON, INC., New York, NY (US)

(72) Inventor: Joel Ezell, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/206,855

(22) Filed: Jun. 7, 2023

(65) Prior Publication Data
US 2023/0403357 A1    Dec. 14, 2023

Related U.S. Application Data

(60) Provisional application No. 63/350,064, filed on Jun. 8, 2022.

(51) Int. Cl.
*H04M 3/428* (2006.01)
*G10L 15/26* (2006.01)

(52) U.S. Cl.
CPC ........... *H04M 3/4283* (2013.01); *G10L 15/26* (2013.01)

(58) Field of Classification Search
CPC .............................. H04M 3/4283; G10L 15/26
See application file for complete search history.

(56) References Cited

U.S. PATENT DOCUMENTS

| | | | |
|---|---|---|---|
| 5,535,270 A * | 7/1996 | Doremus | H04M 3/523 379/245 |
| 9,438,730 B1 * | 9/2016 | Lillard | H04M 3/4936 |
| 10,228,827 B2 * | 3/2019 | Miller | H04M 1/724 |
| 10,250,749 B1 * | 4/2019 | Boone | H04M 3/4935 |
| 10,306,059 B1 * | 5/2019 | Bondareva | G06N 20/00 |
| 10,560,575 B2 * | 2/2020 | Segalis | H04M 3/42093 |
| 2016/0379470 A1 * | 12/2016 | Shurtz | H04W 4/16 455/404.2 |
| 2018/0007102 A1 * | 1/2018 | Klein | H04L 65/612 |
| 2019/0068784 A1 * | 2/2019 | Reddy | H04M 3/5116 |
| 2019/0311036 A1 | 10/2019 | Shanmugam | |
| 2020/0314245 A1 * | 10/2020 | Chavez | H04M 3/5235 |

(Continued)

FOREIGN PATENT DOCUMENTS

| | | |
|---|---|---|
| CA | 2 989 181 A1 | 4/2019 |
| WO | 2020/0129419 A1 | 6/2020 |

OTHER PUBLICATIONS

International Search Report and Written Opinion of Oct. 19, 2023 for PCT Application No. PCT/US2023/024695, 11 pages.

*Primary Examiner* — Lisa Hashem
(74) *Attorney, Agent, or Firm* — POLSINELLI LLP

(57) ABSTRACT

The present disclosure relates generally to facilitating two-way communications. One example involves receiving a hold indication associated with a hold status for the two-way voice communication session, and executing a hold bot for the communication session. Hold bot functionality is communicated as part of the two-way voice communication session, and when the hold bot functionality message is received by the user computer device, the user computing device generates a voice message. The system receives and processes processing the voice message using a voice-to-text system of the hold bot to generate a voice-to-text message, and transmits the voice-to-text message during the hold status so that the agent device receives the voice-to-text message during the hold status.

18 Claims, 16 Drawing Sheets

(56) References Cited

U.S. PATENT DOCUMENTS

2021/0084154 A1* 3/2021 Paiva .................... G06F 3/0482
2022/0311811 A1* 9/2022 Sivakumar ............ G10L 15/222
2024/0244131 A1* 7/2024 Wolinsky ................ H04M 3/51

* cited by examiner

AI BASED HOLD MESSAGING

CROSS-REFERENCE TO RELATED APPLICATIONS

This application claims the benefit of U.S. Provisional Application No. 63/350,064, filed Jun. 8, 2022, titled "HOLD MESSAGING," which is hereby incorporated by reference, in entirety and for all purposes.

FIELD

The present disclosure relates generally to facilitating voice communications. In some examples, messaging and/or interactions between a customer and a hold bot, which can be implemented with generative artificial intelligence or other machine learning systems, are enabled when a voice communication is in a hold status.

BACKGROUND

Clients often use telephony systems and/or network-based chat systems to field communications from users seeking assistance with products or services. Communication systems that support such user interactions may allow users to speak or chat with a live representative of the client. Such communication systems may additionally or alternatively use automated bot systems for two-way interactions with users.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Examples described herein relate to communication systems configured to provide information to users with assisted computing-based systems, which can be referred to as "bots". Such systems can be configured to provide assistance and to facilitate a two-way communication for a wide variety of user inquiries. Such systems can operate with both human agents and non-human agents (e.g., bots) assisting customers or other users for issues related to a system client (e.g., a business that uses the system to provide information and assistance to clients.) Bot systems can be implemented using generative artificial intelligence systems based on large language models, scripts, or other machine learning systems. Such systems can use hold functionality to place a communication session into a hold state when a human agent is unavailable or taking actions such as researching customer issues or waiting for action from a third party or other system. Such a hold state can be a source of significant dissatisfaction for customers of a business. Aspects described herein provide mechanisms for a customer to communicate with an agent during a hold status. Such systems can improve customer satisfaction, decrease system use time, and provide mechanisms for a customer to further a resolution to a customer issue when a human agent is unavailable. Aspects described herein can particularly be used to enable various functionality when a human agent is unavailable. A hold "bot", or non-human agent, can be used in a hold status to provide such functionality during the hold state. For example, a hold bot can be configured accept voice communications from a customer, perform a voice-to-text operation on the voice communication, and provide the text information from the customer to a human agent involved in the two-way communication. Such aspects can improve the operation of a communication system by allowing a customer to provide information to a human agent during a hold status, rather than requiring the customer to wait until the end of the hold status to provide the information to the human agent.

Various additional aspects can provide such hold bot functionality during different stages of a two-way communication, such as at an initial interaction prior to selecting a human agent, repeatedly during multiple hold status cycles, or at various other points in the flow of a two-way communication as described herein.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended figures.

Figure 1:
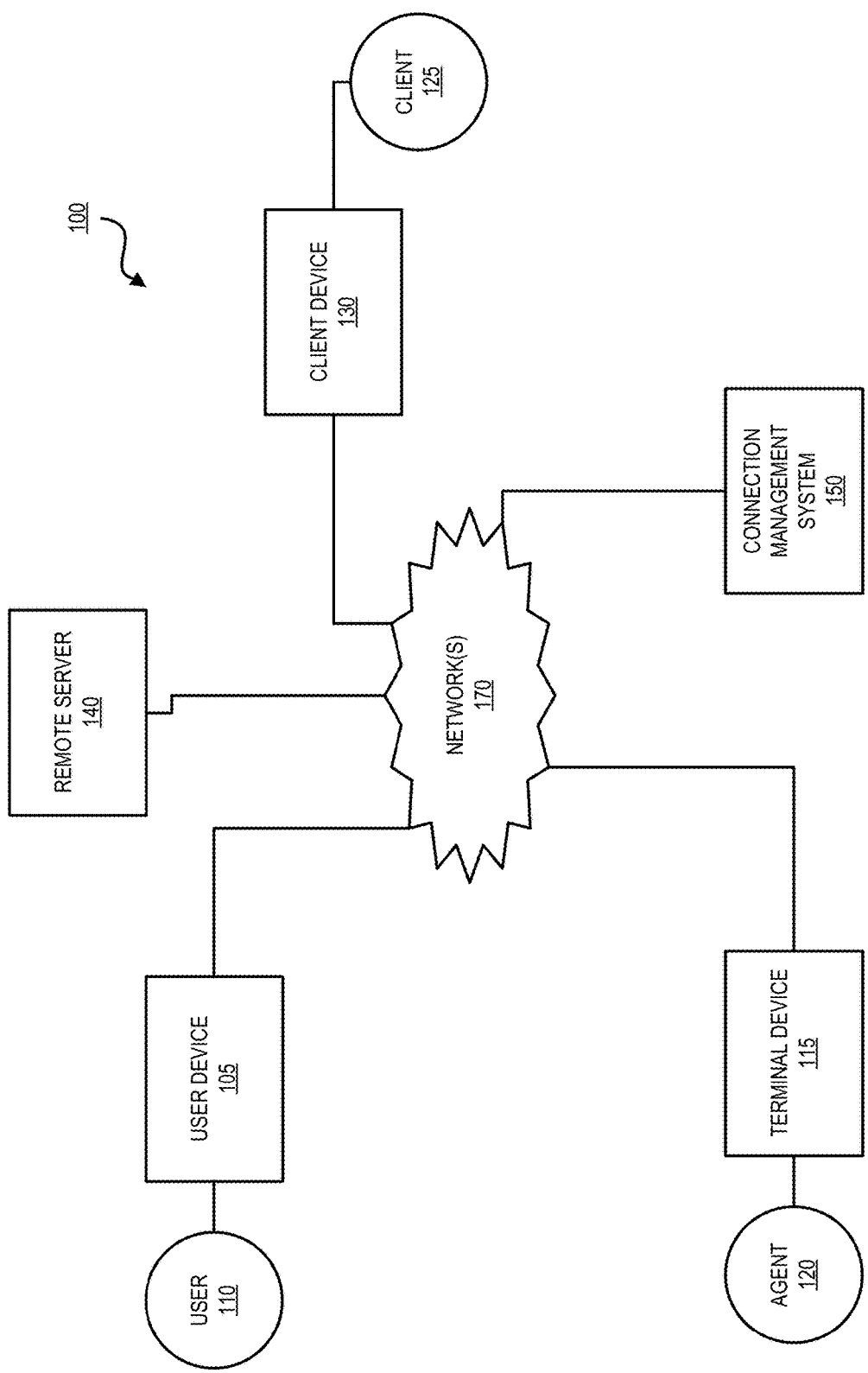
FIG. 1 shows a block diagram of an embodiment of a network interaction system that can be used in accordance with examples described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

As described above, examples relate to communication systems configured to provide information to users with assisted computing-based systems. The assisted computing bases systems can include support for human agents, and non-human agents, which can be referred to as "bots". When a user (e.g., an individual or customer of a business) contacts or is contacted via a two-way communication system for information related to a client (e.g., a merchant or business providing information or service via the two-way communication system), such bots can be configured to provide assistance either in a completely automated fashion, or by assisting agents to respond to wide variety of user inquiries. In many systems, human agents are used to respond to complex issues, and interactions between customers and human agents can involve hold times when a customer is waiting for an initial interaction with a human agent or waiting for a human agent to return to a voice communication after the two-way communication is placed in a hold status (e.g., to allow the human agent to research an issue or interact with another party.)

Aspects described herein include the use of a hold bot (e.g., a non-human agent associated with a hold status) to enable various functionality when a human agent is unavailable. In some aspects, a hold bot can accept voice communications from a customer, perform a voice-to-text operation on the voice communication, and provide the text information from the customer to a human agent involved in the two-way communication. Such aspects can improve the operation of a communication system by allowing a customer to provide information to a human agent during a hold status, rather than requiring the customer to wait until the end of the hold status to provide the information to the human agent.

In some other aspects, the hold bot can provide additional functionality in addition to providing automated services during a hold status initiated by a human agent. For example, in some aspects, a hold bot is additionally used to gather information from a customer prior to an initial voice interaction with a human agent as part of a two-way communication. The hold bot can gather initial information, and convert the information to text to present to the human agent as the human agent joins the interaction. The information gathering can include initial intent or issue identification information that is used to help direct the customer to an appropriate human agent. The hold bot can also gather identifying information that the human agent would otherwise request, saving time for the human agent interaction. The hold bot can then assist with transferring the information to a human agent when a human agent becomes available. In some implementations, a hold bot can be initiated automatically when a human agent is unavailable, and hold bot functionality can be interrupted when the human agent becomes available. If the human agent then initiates a hold status, the interrupted functionality can continue as interrupted, if the functionality has not been completed by the human agent interactions.

In some other aspects, as described above, a hold bot can accept voice comments from a customer, convert the voice comments to text, and perform additional functionality in addition to presenting the text generated from the customer voice message to a human agent. Such operations can occur prior to an initial interaction between a human agent and a customer, or after a human agent has placed the two way communication into a hold status after voice interactions with the customer. In addition to providing voice to text conversion that can provide text copies of voice messages from a customer to an agent, other functionality can be provided by a bot. For example, in some aspects, a bot can provide appointment or rescheduling functionality. As part of such functionality, a human agent may have a chance to interact with the customer, either to provide an update during the hold status before the customer leaves a two-way communication, or to interact with the customer about details of an issue that may impact rescheduling (e.g., time periods or delays intermediate steps or operations to assist with a customer issue may take a certain period of time, with a follow up preferred to occur after the certain period of time.) Additional functionality can also include information gathering ad addition of the information to a database or a data interface that can be accessed by the human agent or other systems.

The use of such a hold bot can improve the operation of a device or a two way communication system by reducing the device time needed to resolve a customer issue, and by reducing unproductive hold time or time when a customer is unable to communicate any information to a human agent or a system as part of a two way communication. Such use of a hold bot can additionally improve system operation by improving customer sentiment associated with two-way interactions that can result from traditional hold status systems where a customer is unable to communicate information to an agent or deal with other issues (e.g., situations terminating a two-way communication without options to re-establish a related communication at a later time). Associated increases in customer satisfaction and sentiment greatly improve the value and functionality of devices and communication systems for system users.

Further, in some implementations, machine learning and artificial intelligence feedback can be used with hold bot functionality to identify effective events or times associated with use of the hold bot, as well as to improve the effectiveness of the functionality provided by a hold bot. Such operations can, for example, use both human agent and user feedback, as well as analysis of two-way communication transcripts, to identify positive and negative interactions and effectiveness involving hold bot functionality, and to influence future hold bot use based on such feedback.

Additional details of various systems and system aspects including hold bots are described below.

FIG. 1 shows a block diagram of an embodiment of a network interaction system 100 which implements and supports certain embodiments and features of hold bots as described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 (e.g., a customer) can be an individual contacting a merchant (e.g., a client 125) communication service provided by a remote server 140. The client 125 can be an entity that provides, operates, or runs a web site, an online service, a business, or individuals employed by or assigned by such an entity to perform the tasks available to a client 125 as described herein. The agent 120 can be an individual, such as a support agent tasked with providing support or information to the user 110 regarding the website or online service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual looking for assistance for an issue from a personal computing device, a client 125 can be a company that sells products and uses a communication system to resolve customer issues, and an agent 120 can be a representative employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

In some aspects, a hold bot as described herein can operate as part of connection management system 150 to engage in initial information gathering from the customer 110 and for routing communications from user device 105 to client device 130, terminal device 130, remote server 140, or any other appropriate device. In some aspects, connection management system and remote server 140 can be part of a shared system that includes a shared hold bot functionality to both gather information for connection management system 150 routing, and subsequent assistance of agent 120 and terminal device 115 by the shared hold bot functionality of a remote server 140 or other functionality provided by a connection management system 150 that includes additional functionality.

Part of strategic-routing facilitation by a connection management system 150 can include establishing, updating and using one or more connection channels between network device 105 and one or more terminal devices 115. For example, upon receiving a communication from network device 105, connection management system 150 can first estimate to which client (if any) the communication corresponds using information gathered by a hold bot. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to content in a network-device message. For example, a hold bot executed in a server associated with connection management system 150 can receive a voice message or other information from user device 105, and use that information to determine an issues associated with user 110 and a two way communication to be established with a terminal device 115 to resolve the customer issue. In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115 (e.g., a voice communication channel). In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices. Such selections can additional be used to determine hold bot operations as part of a two way communication. Such functionality can include initial hold bot data gathering (e.g., to identify customer purchases, accounts, or other information associated with user device 105), scheduling, or issue identification prior to terminal device 115 routing.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application (e.g., a hold bot or systems to support hold bot operation) may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data. In some aspects, the hold bot can provide bot associated audio communications to authorize such automated data collection, or can provide voice prompts for a user to accept or select various data collection options prior to routing to terminal device 115.

Figure 2A:
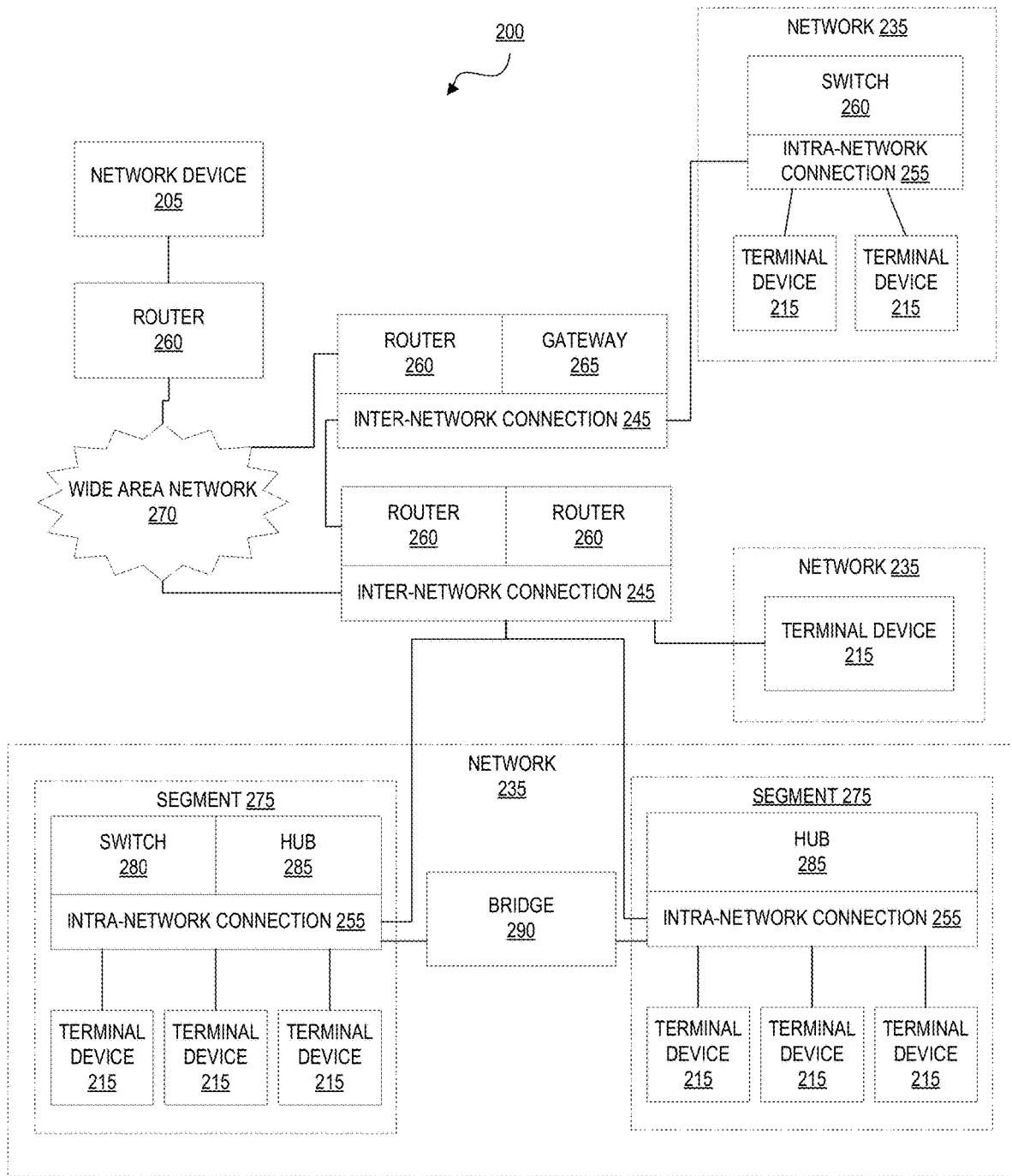
FIG. 2A shows a block diagram of another embodiment of a network interaction system that can be used in accordance with examples described herein.

FIG. 2A shows a block diagram of another embodiment of a network interaction system 200. Generally, FIG. 2A illustrates a variety of components configured and arranged to enable a network device 205 to communicate with one or more terminal devices 215. The depicted instance includes nine terminal devices 215 included in three local-area networks 235. Any of the described devices can support hold bot usage for two way communications as described herein.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

Figure 2B:
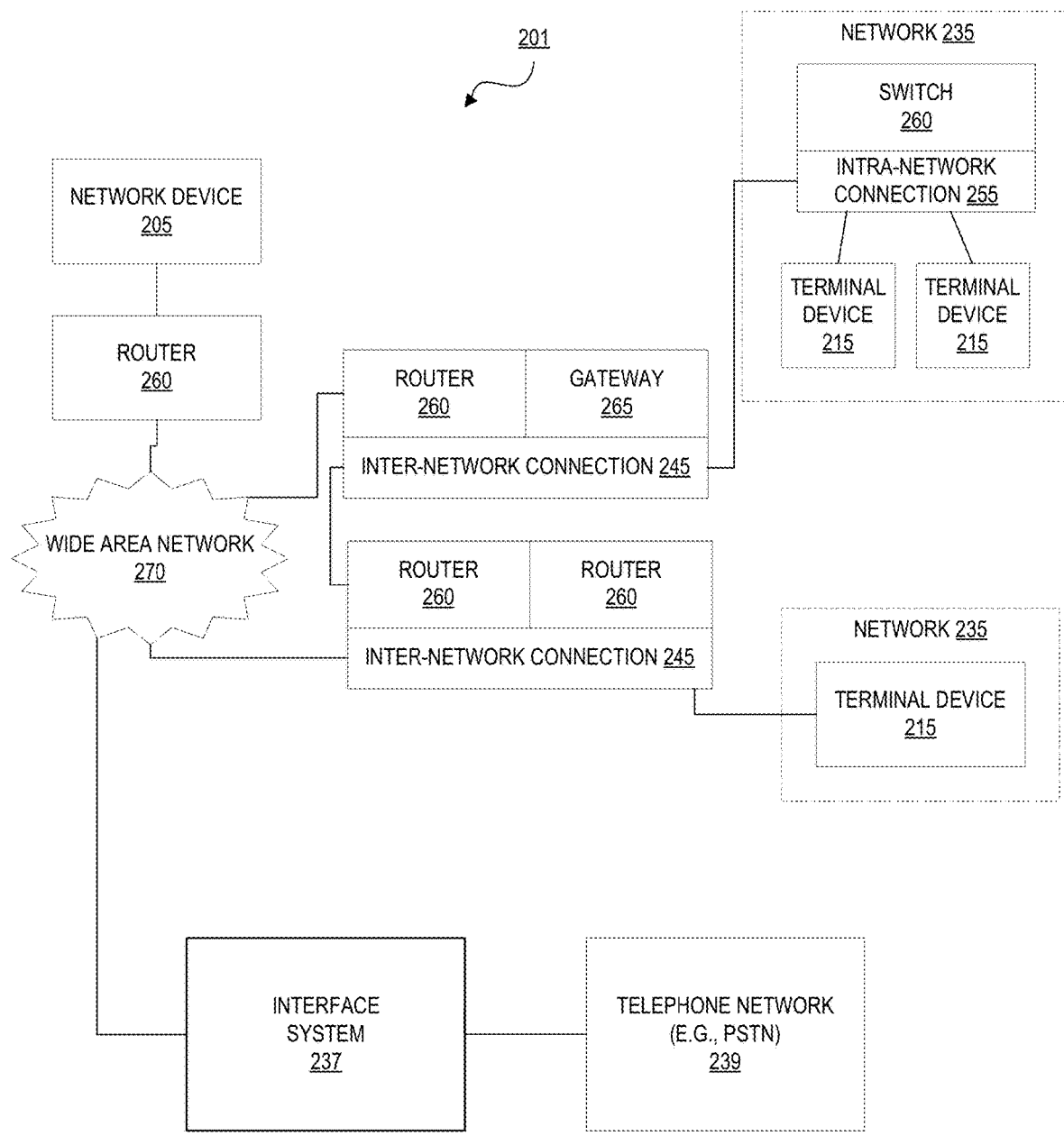
FIG. 2B shows a block diagram of another embodiment of a network interaction system that can be used in accordance with examples described herein.

FIG. 2B shows a block diagram of another embodiment of a network interaction system 201 that can be used in accordance with examples described herein. The system 201 includes elements similar to the system 200 of FIG. 2A, but additionally illustrates a connection with a telephone network 239 as described below.

The system 201 includes wide area network 270 that connects various network devices 205, routers 260, and networks 235 (e.g., along with associated terminal devices 215 and any switches 260 and intra network connections 255, etc.). Such elements can further connect to standards or legacy telephones via a telephone network 239. The telephone network 239 can, for example, be a public switched telephone network (PSTN). A PSTN can include one or more circuit-switched telephone networks made up of telephone lines, fiber optic cables, switching centers, cellular networks, satellite communication systems, cable communication systems, etc. that communicate voice signals. Such a telephone network 239 can additionally include Private Branch Exchange (PBX) telephone systems that operate a local phone exchange for managing call transfer, voicemail, hold systems, and other such structures. In some implementations in accordance with aspects described herein, a hold bot can be implemented within call hold structures of a PBX as described further below. In order to interact with other systems described above, an interface system 237 can be used to allow the telephone network 239 to interact with the network devices described above. Interface system 237 can, for example, be a Voice-over Internet Protocol (VoIP) system that allows Internet (e.g., IP configured) devices to communicate with PSTN devices. As described herein, any agent terminal (e.g., terminal device 115), user device (e.g., user device 105), or client device (e.g., client device 130) can be involved in a two-way communication as either part of a network as described above, or as part of a phone communicating via a telephone network 239.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Additionally, as described above, devices can communicate and be connected via systems described herein regardless of whether the devices are connected via an IP network (e.g., the internet) or a phone network (e.g., PSTN). Regardless of the connection type of devices in a two-way communication, a connection management system (e.g., connection management system 150) can provide logic for routing to connect users to appropriate agents, and to enable hold bot functionality. Additionally, as described further below, connection management systems for any such devices can provide speech-to-text (STT) and text-to-speech (TSS) functionality as part of routing and connectivity features described herein. Such STT and TSS functionality can be integrated with a connection management system, or can be integrated via connections to a connection management system. In many such implementations, a user device can be connected to a PSTN, with an agent terminal connected to a network (e.g., either an internet protocol (IP) network, a private branch exchange (PBX) network, or any such system supporting agent terminal devices as described herein). The user device can be connected to a connection management system 150 as part of a two-way communication initiated by the user device for customer service from a client (e.g., client 125). The connection management system can include STT that converts voice communications from a user device to text communications at an agent terminal device. The agent terminal device can send text to the connection management system 150 that is converted to voice for transmission to the user device.

Figure 3A:
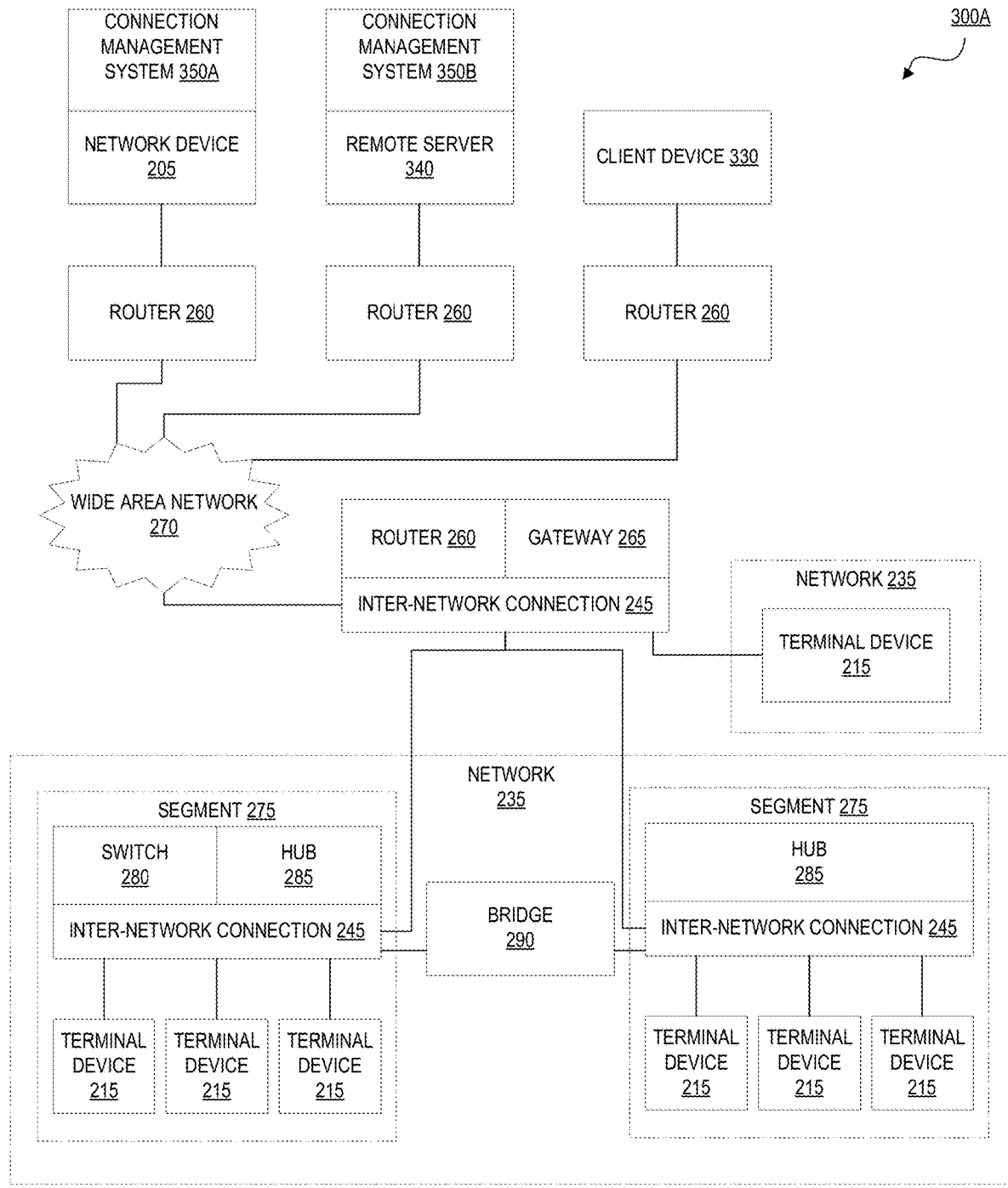
FIGS. 3A-3C show block diagrams of other embodiments of a network interaction system that includes a connection management system that can be used in accordance with examples described herein.
Figure 3B:
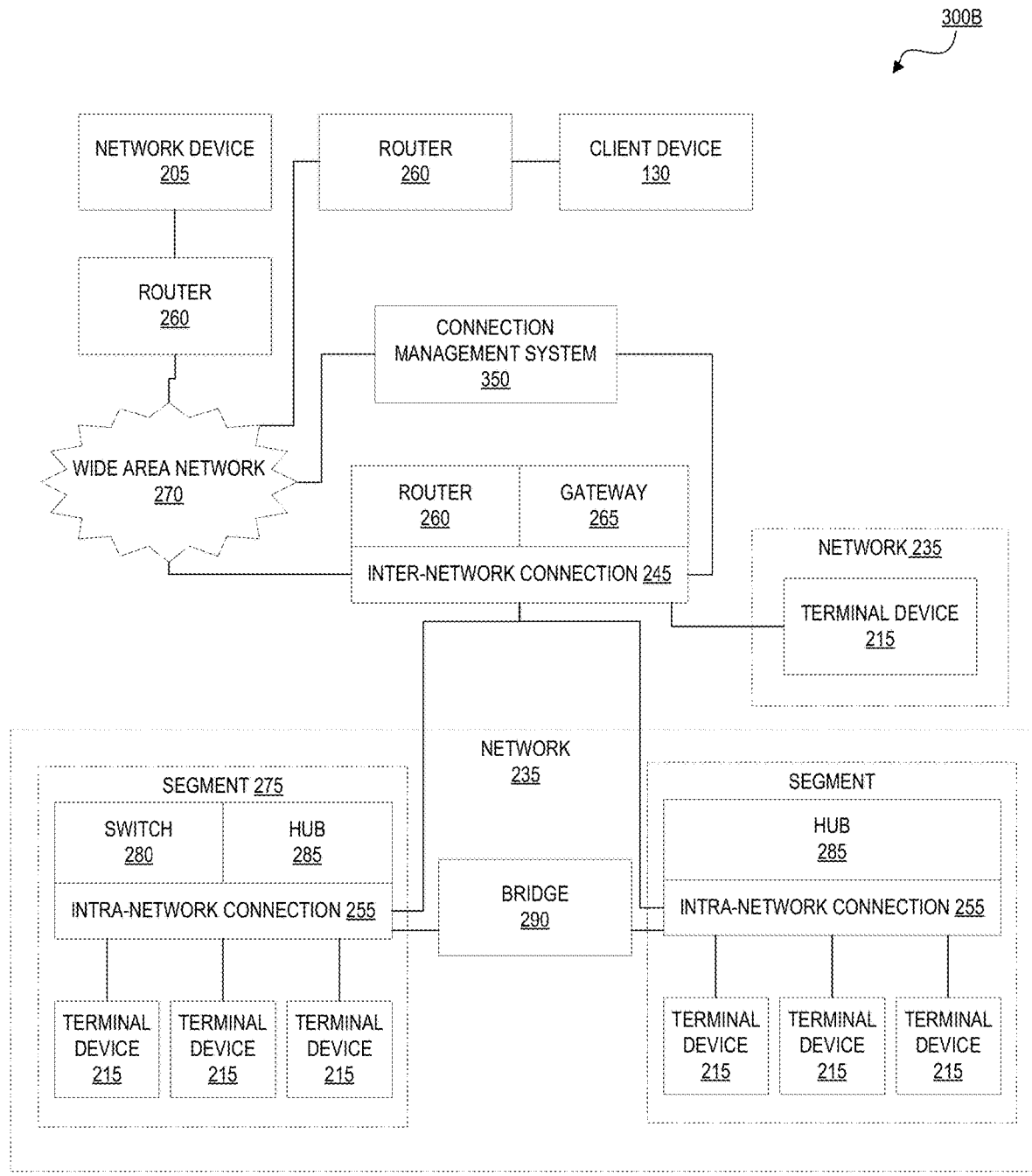
Figure 3C:
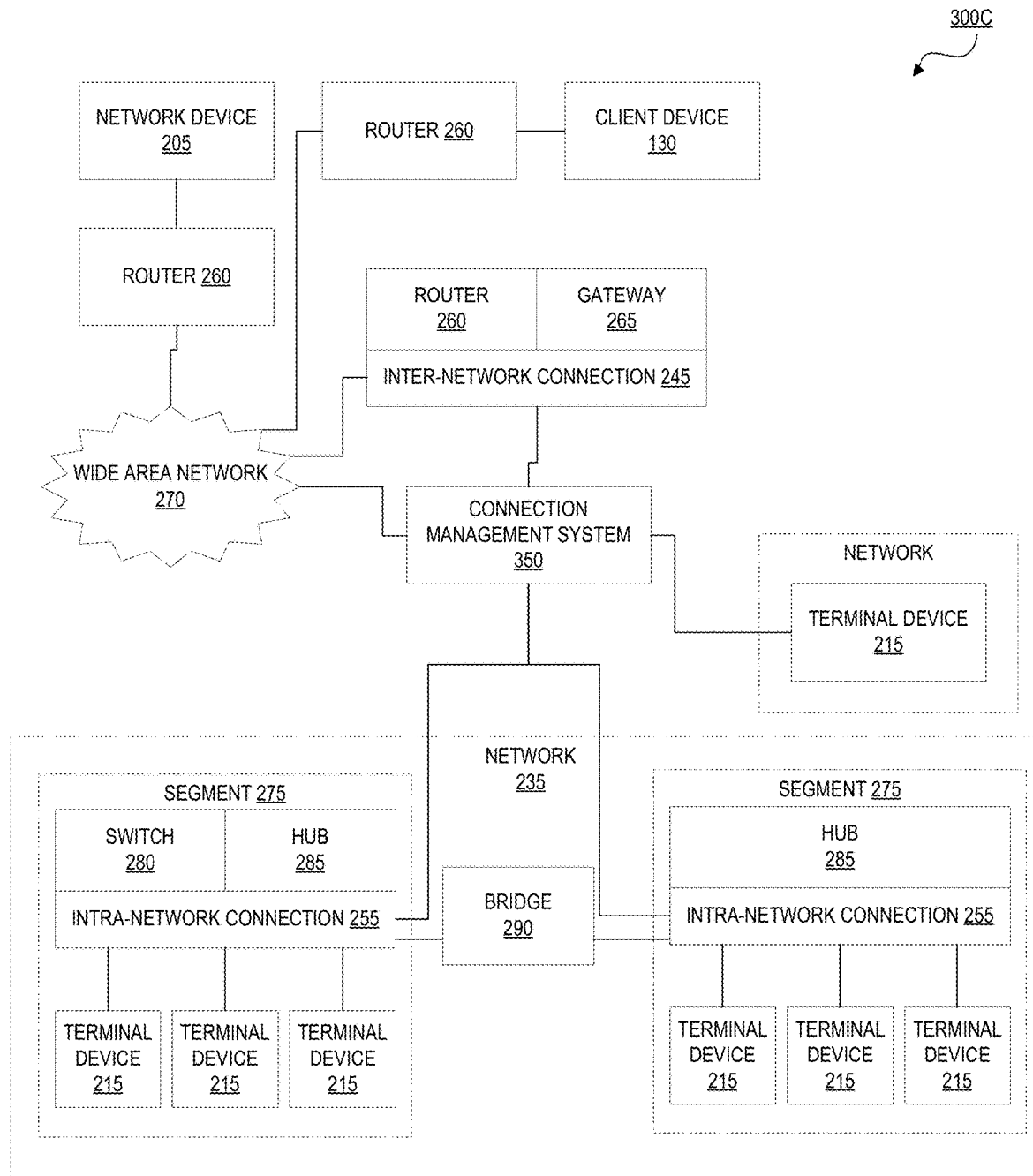

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300A-C include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on. The client device 330 can additionally provide client data indicating how hold bots are to be used during two way communications, including two way voice communications. Such data can additionally include menu selection information, rules for when and how to transition a two way communication from the hold bot to a human agent, rules for scheduling follow up communications, or other such data.

Connection management system 350b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, connection management system 350b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers). Additionally, as indicated above, any such system can be integrated with a telephone network (e.g., telephone network 239) such as a PSTN. As described herein, any hold bot functionality can be integrated with two-way communications managed by a connection management system (e.g., connection management system 150) where devices can be connected via either a telephone network or an IP network.

Figure 4:
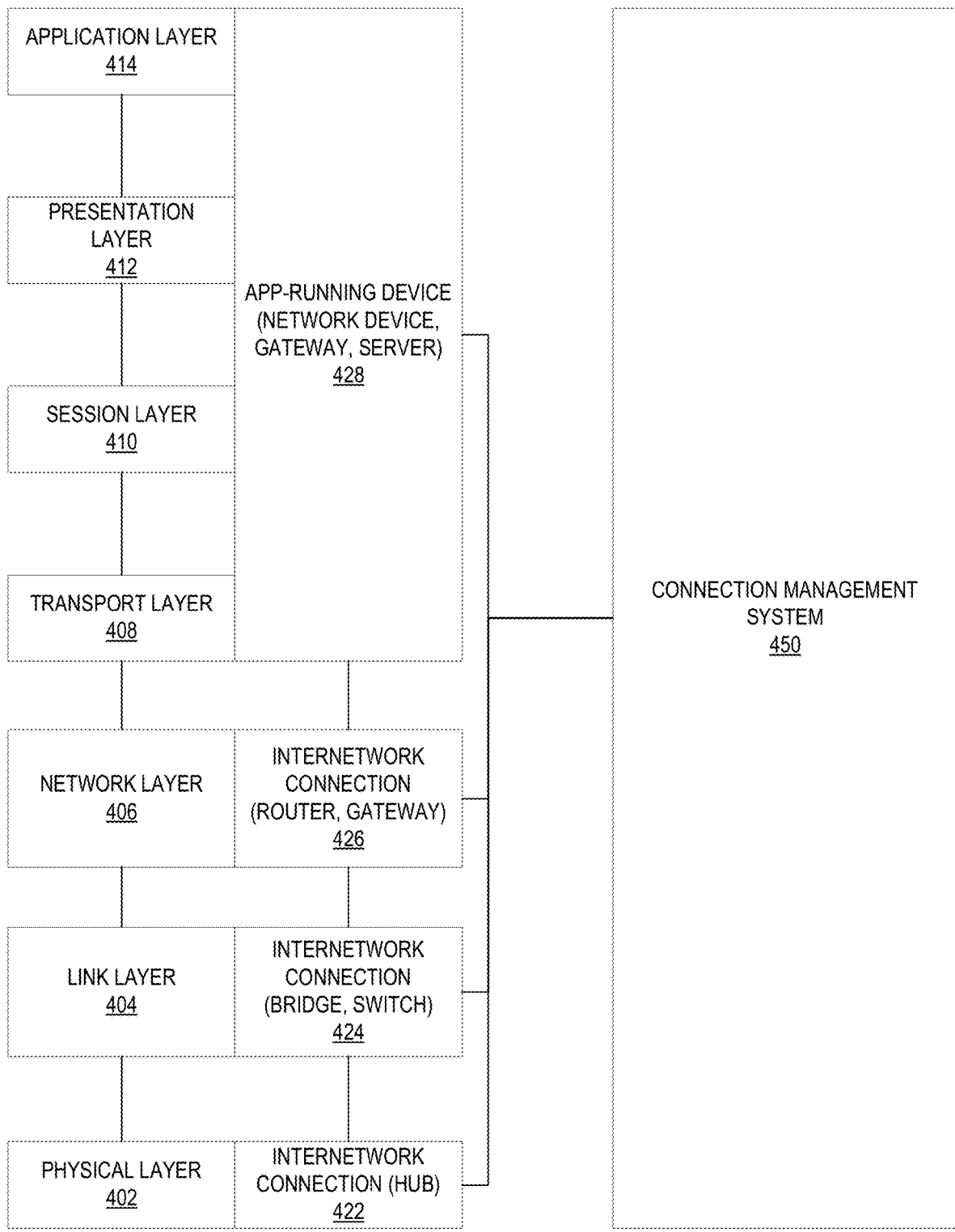
FIG. 4 shows a representation of a protocol-stack mapping of connection components' operation that can be used in accordance with examples described herein.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

The influence can include not only routing and channel establishment, but can also include integration of applications for hold bot functionality as described herein, along with any other such functionality. This can include TTS and STT translation of communications between devices, transcript generation or operation tracking for hold bot functionality, routing, and any and all aspects of two-way communications as described herein. Further, in some implementations, data routed with the assistance of the connection management system 450 or influence by system 450 can be stored and used by machine learning systems to provide feedback and improved operation of any functionality described herein.

Figure 5:
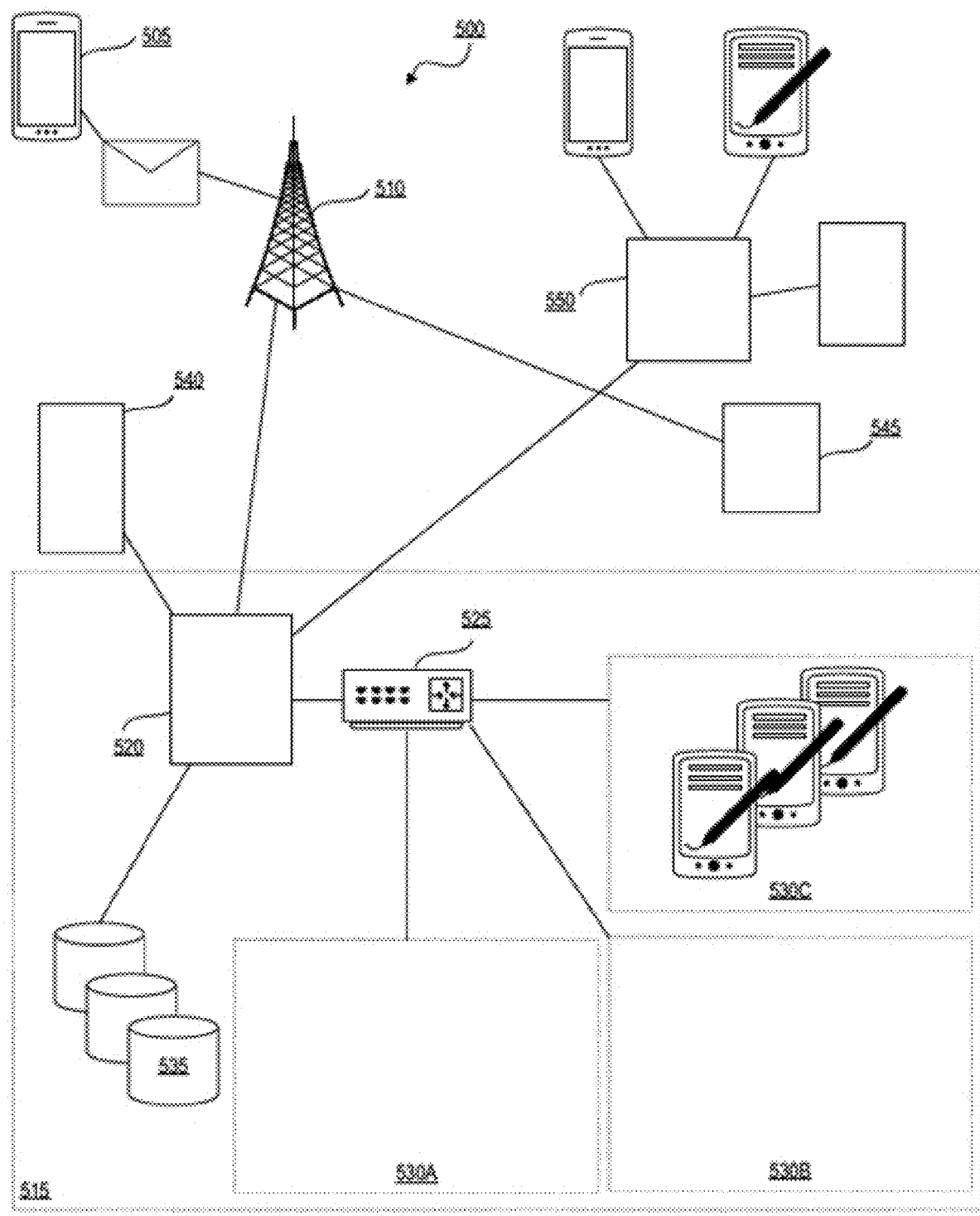
FIG. 5 represents a multi-device communication exchange system that can be used in accordance with examples described herein.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity) at one or more data stores. Such data may influence communication routing.

Notably, various other devices can further be used to influence communication routing and/or processing. For example, in the depicted instance, connection management system 520 also is connected to a web server 540. Thus, connection management system 520 can retrieve data of interest, such as technical item details, and so on.

Network device 505 may also be connected to a web server (e.g., including a web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) behavior of a given user or class of users.

Figure 6:
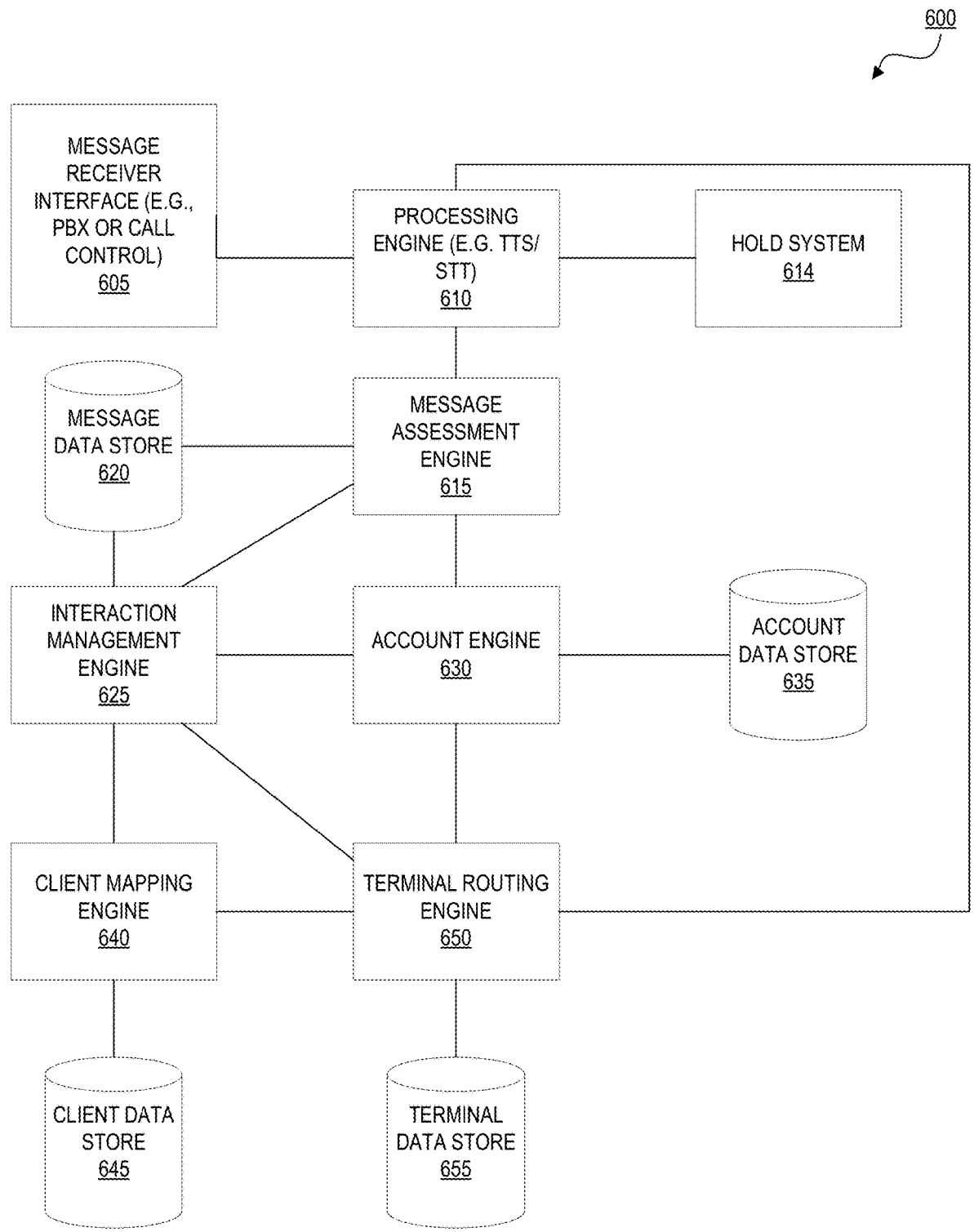
FIG. 6 shows a block diagram of an embodiment of a connection management system that can be used in accordance with examples described herein.

FIG. 6 shows a block diagram of an embodiment of a connection management system 600 including a hold system 614 to support hold bot operations. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of audio (e.g., voice, pre-recorded bot messages, etc.) messages exchanged being routed between two devices (e.g., a customer network device and a human agent terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices. In various implementations, the message receiver interface includes call control systems for managing incoming voice connection requests, or systems for handling both incoming text communications and voice communications. In other implementations, the message receiver interface can be part of PBX control functionality when the connection management system 600 operates as part of a PBX.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange. In some implementations, as described above, the incoming message is a connection request from a user device operating as part of a PSTN. In other implementations, the incoming message operates as a connection request from a device in an IP network.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network). The processing engine can additionally include TTS and STT functionality. In some implementations, the additional downstream engines and system elements operate by storing and processing text as a more efficient operation than processing voice information, and the processing engine can convert voice or sound information to text data (e.g., with a user such as user 110 interacting via voice and an agent such as agent 120 interacting via text with TTS/STT translation provided by the processing engine 610). Even when an agent and user are both communicating via voice, the processing engine 610 can convert all voice communications to text to enable efficient storage and processing of message data associated with a two way communication. Such text transcripts can then be used in operations described below, or any operations described herein, such as machine learning feedback systems, using text transcripts, even when communications between users and agents occurs via voice.

In various implementations, the message receiver interface, the processing engine 610, or any other such element of a connection management system 600 can parse or process an incoming signal for inclusion of a hold signal. As described herein, such signals can include binary computer telephony integration (CTI) signals. In other implementations, other indicators can be used, such as Unicode Transformation Format (UTF) encoded signal. Such a signal and other such signals can further include JavaScript Object Notation (JSON), Extensible Markup Language (XML), or other such structured data in a signal to indicate a hold status. Any such signals (e.g., UTF JSON, XML, etc.) can be used as a flag to manage hold bot functionality as described herein. When such a signal is identified, the hold system 614 can react, either to provide standard hold functionality, or to engage hold bot functionality as described herein. Various system states, including customer system preferences, user identity information, system resource availability, or other such system state criteria, can be used to determine how the hold system 614 is used to react to a given hold signal (e.g., hold or unhold).

As described herein, a hold system 614 can be used with a hold bot to manage interactions not directly part of communications between a human agent and a customer. When a customer initiated a communication with a system to address a customer issue, or a human agent uses a communication system to reach out to a customer, the hold bot managed by hold system 614 can be used to manage initial system interactions with the customer, interactions after a human agent has placed a two way communication into a hold state, or both. The hold system 614 can be used in managing or receiving information from any system described below to facilitate interactions with the human agent and to gather information for the communication system. As described above, TTS and STT systems can provide text data to the hold system 614 to allow simplified processing of information by the hold system 614. Similarly, outputs from the hold system 614 can be generated as text, and processed to voice by the processing engine 610 when a user is receiving voice communications as part of a two way communication managed by a connection management system 600.

A message assessment engine 615 may assess the (e.g., extracted or received) message. The assessment can include identifying, for example, one or more categories or tags for the message. Examples of category or tag types can include (for example) topic, sentiment, complexity, and urgency. In some aspects, this can further include initial triggers to determine that a voice communication from a customer is to be managed by a hold bot, and can identify that the voice communication is to be converted to a text communication for further action. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency). In some aspects, for example, the message assessment engine 615 can be used to assess whether a voice communication from a customer is to be converted to text and relayed to a human agent, or used to access other functionality, such as managing an end to the communication, rescheduling the communication, information management, or other such functionality that may be performed between the customer and the hold bot without human agent involvement.

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

In some aspects, a hold bot (e.g., implemented using the hold system 614) can be associated with a voice menu, which uses audio data provided from the system to a customer device to instruct the customer on voice inputs or other inputs (e.g., keypad selections) that are recognized by a system. The message assessment engine 615 can be used with hold system 614 to identify predetermined voice inputs from a customer that can be identified and used to access hold bot functionality as part of hold system 614 (e.g., using TTS and STT functionality of the processing engine 610).

An interaction management engine 625 can determine to which device a communication is to be routed to, how the receiving and transmitting devices are to communicate, and any relevant bots to be used or recommended to an agent as part of a two-way communication. In some aspects, if a customer is interacting with a hold bot, the interaction management system can manage a transition to a human agent communication, between different human agents, with other bot functionality outside the scope of the hold bot, or any other such systems. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on). In some implementations, this can operate with or as a supplemental support to the processing engine 610. For example, if an input is received selecting a specific language, language support systems can be accessed to support STT and TTS for the specific language. In various implementations, this functionality can be implemented within the processing engine 610 to support multiple languages, or the processing engine 610 can be directed to additional resources to support STT and TTS for multiple languages supported by a system.

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device). In various aspects, client mapping engine 640, interaction management engine 625, client data store 645, and other such systems can be accessed by or integrated with a hold bot as part of hold system 614, as well as interacting with a human agent terminal. In some aspects, interaction management engine 625 can be used to manage transitions between hold bot interactions and human agent interaction. For example, in some aspects, when a human agent initiates a hold status for a two way communication, a threshold amount of time can be selected prior to a hold bot initiating a contact with a customer. Similarly, if a human agent ends a hold status while a hold bot communication is being presented to a customer or while a customer is providing information to a hold bot, the interaction management system can be used with any other system to manage the transition. In some aspects, this can involve connecting the human agent to a voice channel while an audio communication from the hold bot is being provided to the customer, and can allow the human agent to talk on a voice channel with the customer while voice information (e.g., recorded or machine voice) data is being provided from a voice bot.

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun. In some aspects, a hold bot as part of hold system 614 can interact with a customer to gather identifying information, issue information, issue details, or any data from a customer that can be stored as part of client data store 645, terminal data store 655, an associated database, or any other such system memory.

It will be appreciated that, in various contexts, being engaged in one or more communication exchanges does not necessarily indicate that a terminal device is not available to engage in another communication exchange. Various factors, such as communication types (e.g., voice), client-identified or user-identified target response times, and/or system loads (e.g., generally or with respect to a user) may influence how many exchanges a terminal device may be involved in.

Systems and methods for transferring messaging to automation via a bot during communication sessions with network devices (e.g., operated by users) are provided. A user may use a network device to initiate a conversation with an agent regarding resolution of an issue. The agent may initiate a hold status that can implement bot functionality as part of a hold status. The hold bot can implement voice to text functionality to allow a customer to speak during the hold status, and have the speech converted to text and displayed on a terminal device of the agent. In some aspects, functionality can be provided based on time thresholds. For example, after an agent initiates a hold status, an initial period of the hold status may not have any associated bot functionality. Such an initial time can allow a human agent time to take an independent action prior to receiving information from a customer. In some aspects, certain triggers can be implemented to change the bot functionality provided to a user. For example, an initial time period of a hold status can enable voice to text functionality, to allow interactions between a customer and an agent, and after a threshold period of time, or an indication from a human agent that the hold status may last for at least an additional threshold period of time, additional functionality, such as a hold time estimate, a rescheduling functionality, a data gathering functionality, or other functionality that may be disabled if a short hold status is expected, can be enabled by a time threshold or a selection by a human agent.

In some aspects, bot functionality can involve presentation of questions to clarify or narrow details of a user's intent or details of a user issue. Bot functionality can additionally allow collection of key customer issue details. Key user information may also be provided, such as order number, account number, and the like via the hold bot, to save human agent interaction time.

In some implementations, a hold bot can be configured to autonomously communicate with network devices. Further, hold bots can be configured for a specific capability (e.g., based on a user issue or client selection and configuration of desired hold bot functionality). Examples of capabilities can include updating database records, providing updates to users, providing additional data about the user to agents, determining a user's intent and rerouting the user to a destination system based on the intent, predicting or suggesting responses to agents communicating with users, escalating communication sessions to include one or more additional bots or agents, and other suitable capabilities. In some implementations, while a hold bot is communicating with a network device (e.g., operated by the user) during a communication session (e.g., using a voice recognition and voice to text interface), a communication server can automatically and dynamically determine to additional functionality that can be enabled, or automatically and dynamically suggest information or agent assistance tools. For example, bots can communicate with users about certain tasks (e.g., updating a database record associated with a user).

In various implementations, a connection management system 600 can simultaneously manage voice communications with hold system 614 functionality for hundreds, thousands, or any number of customers, human agents, and hold bots, depending on the resources available to the connection management system 600. Thus, for a first customer, hold system 614 can implement voice to text functionality during a hold status for a first communication, while at the same time the system 600 allows a hold bot from hold system 614 to gather information from a second customer as part of a second communication. Any hold bot functionality and hold status operation described herein can be performed simultaneously by multiple instances of a hold bot for a hold system 614, so that many hold bot operations can be performed at the same time for any number of customers and two-way communications associated with a customer.

Figure 7:
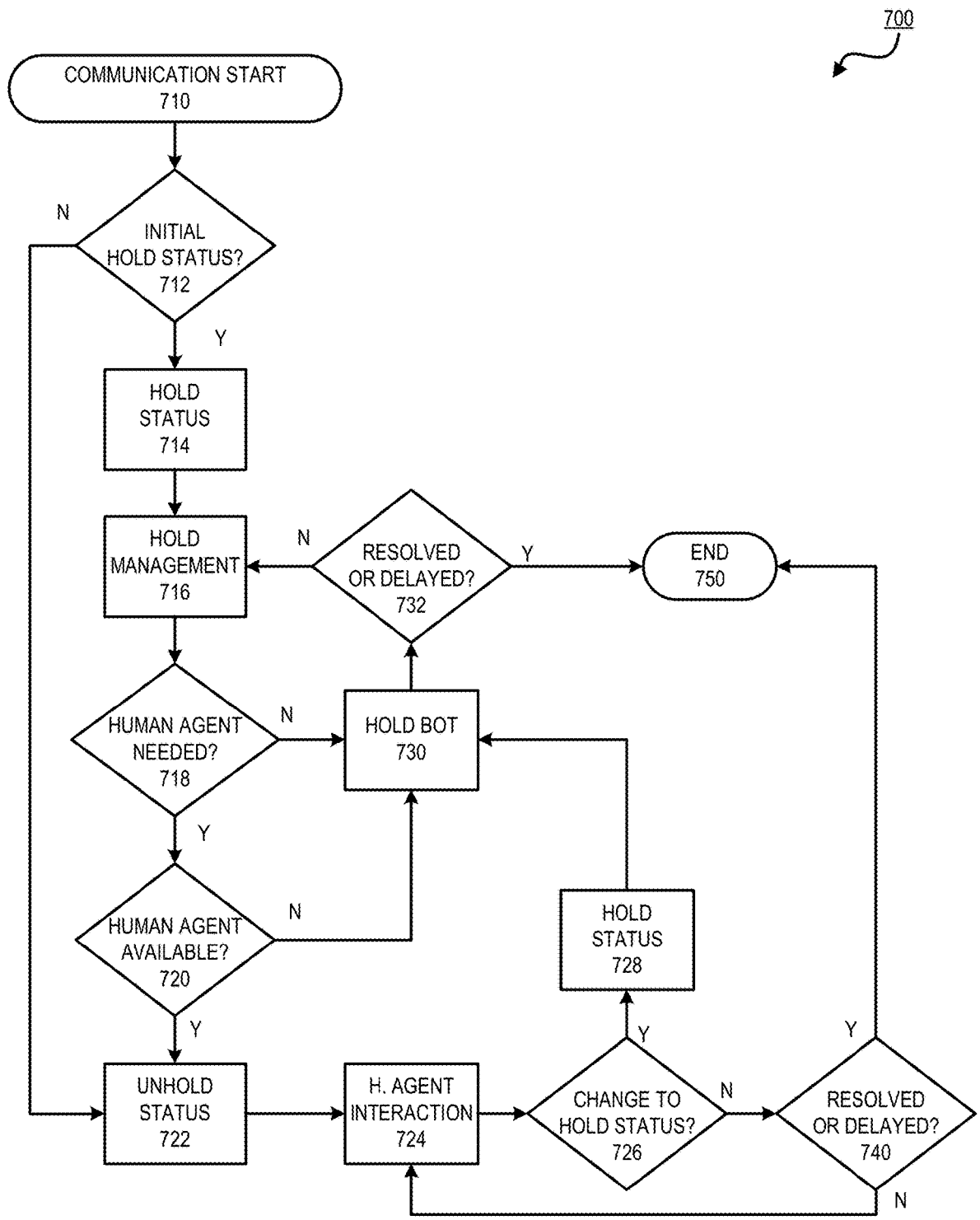
FIG. 7 shows a block diagram of a network environment for generating merged transcripts and automatic bot functionality updates in accordance with examples described herein.

FIG. 7 shows a decision flowchart 700 for a system implementing hold bot functionality in accordance with aspects described herein. Flowchart 700 describes real-time hold bot status implementations as part of an example communication system. As described above, any number of two-way communications can be implemented at the same time, so that a single system can have different communications with different users at different blocks of flowchart 700 functionality at the same time. For example, when a customer calls a system managed by a communication management system (e.g., system 600) or another such system implementing hold bot functionality, flowchart 700 can describe the process of using a hold bot to facilitate the two way communication. Flowchart 700 can also be used when a human agent initiates contact with a customer, as described below. In either case, an initial connection can be attempted, and if a connection between a customer device (e.g., user device 105) and a connection management system 150 is successful, the system can implement flowchart 700 dynamically in real-time for the established communication at communication start block 710.

At block 712, an initial hold status is determined. If, for example, a human agent initiates the communication associated with a given instance of flowchart 700, then there may not be in initial hold status, the communication can proceed to block 722 for an unhold status with a connection immediately established between a customer and a human agent as part of the two way communication. Similarly, if a customer initiates a communication, and a human agent is immediately available without a wait time, and a client selection uses an immediate human agent connection when available, the decision at block 712 is a no, and the flowchart 700 proceed to block 722. If, by contrast, an autodialer is used for a system initiated communication, with a selection for an initial hold bot communication, or if a customer initiates contact and a human agent is either unavailable or a system is configured for an initial assessment performed by a hold bot, then from block 712, a yes for a hold status results in proceeding to block 714 with the hold status implemented in the system. As part of the initial hold status from block 714, a hold bot executed by a server system (e.g., a connection management system 150, 450, 600, etc.) or another such system can perform a bot intake assessment at block 716.

The bot intake assessment 716 can include transmitting questions or menu prompts to gather information from a customer. Data gathered as part of block 716 can be used to determine or update an intent value associated with a communication session, and to identify actions or systems to use as part of the communication session. The action determination as part of block 716 can include determining whether a human agent is needed immediately in block 718, and whether a human agent is available in block 720. The determination regarding whether a human agent is needed in block 718 can be based on information gathered by a hold bot as part of bot intake assessment 716. For example, a hold bot operating as part of bot intake assessment 716 can present a menu with response options to a customer (e.g., "press 1 for scheduling, press 2 for help with a product, etc."). In other aspects, the hold bot can ask the customer to describe the reason the customer is calling, and use natural language processing to determine an intent value, a customer issue value, or other data that can be used to assess whether the hold bot or other bot systems can address the customer issue, or whether a human agent is needed. Depending on the response options selected by the customer, the bot can either proceed to bot interactions in block 730 and attempt to address the customer issue, or if a human agent is available in block 720, to an unhold status in block 722 and a human agent interaction in block 724.

In one implementation, the communication start 710 can occur when a customer device is used to call into a help system associated with a merchant. At the initial hold status of block 712, the system can either determine that an agent is available immediately (e.g., no initial hold status), or can use an automatic hold status to manage customer intake in block 716. The hold management can either be the hold bot used later as part of the system operation, or can be a separate intake and analysis system (e.g., to determine a customer intent or problem value based on customer selection or words spoken to the system by the customer). For example, if the customer speaks the words "I need technical support for my widget", the bot involved in hold management 716 can process this input to determine next steps. If the bot determines that bot systems can respond to the customer issue, the hold bot in block 730 can proceed in a loop of attempts to resolve the customer issue. For example, automated technical support steps or resources as part of the hold bot can be presented to the customer in any number of loops through a resolution analysis in block 732. At a certain point, which can be based on a time threshold, a number of resources used, a customer request, or other such triggers, a loop (e.g., a loop of blocks 716, 718, 730, and 732), can end when block 718 determines that a human agent is needed instead of an automated bot system to assist with the customer intent or customer issue associated with the two way communication initiated at communication start block 710 for a particular instance.

Regardless of whether an initial hold status occurs or not, at block 722, the system is placed in an unhold status, and the customer is connected to a human agent. The human agent interaction 724 can be a simple voice interaction, or can be an interaction assisted by various bot tools or system assistance tools. At certain points in the human agent interaction of block 724, the human agent may need to place the communication in a hold status. For example, for "widget technical support", the human agent may conclude the options or solution steps the human agent is aware of, and the human agent may attempt to contact an expert resource to assist with the customer problem. As part of this attempt, the customer may be placed in the hold status in block 728. In some implementations, the hold status may return to the unhold status without bot interaction. For example, in some implementations, the hold bot may not be called until after a threshold time period or unless selected by the human agent. In other implementations, the hold bot may be used automatically. For example, if previous system analysis (e.g., an intent or customer issue identification) is mapped with some data collection that has not yet been performed, the hold bot may ask the customer to provide this information during the hold status. This can, for example, be additional product details, descriptions, serial numbers, etc. This can also be customer address, payment information, purchase detail, or other such information that can be used in resolving the customer issue or fulfilling the customer intent. During the hold status, the hold bot can allow the customer to send messages to a human agent system, rather than simply holding or interacting with the hold bot. For example, in some implementations, the system can indicate that the user can press a code or input command, and then speak a message that will be communicated to the human agent. Rather than simply relaying the message to the human agent, or providing an indicator that the customer wishes to communicate a message, a voice to text system of the hold bot can convert the voice message from the customer to a text message that is presented to the human agent on an agent device. Such an interaction allows the agent to continue with the action that lead to the hold status, while also allowing the agent to receive the message.

In some implementations, processing can be performed on the content of the customer message. This can, for example, indicate an urgency, or prompt the human agent to end the hold status. If, for example, the hold bot receives a voice message indicating that the customer is becoming irritated, or otherwise having a negative experience, the hold bot can determine this automatically and prompt actions either within the hold bot or by the human agent to address the customer dissatisfaction. This can include an automated action by the hold bot to escalate an importance or a priority of the communication, trigger a shift to a different human agent, or other such action.

After the process of flowchart 700 ends, the success of the system in resolving the customer's technical support question can be analyzed, both by storing all interactions as part of the two-way communication session, and by analyzing decisions and system resource usage as part of the two way communication session. In some implementations, this information can be included in a database of issue resolution data, and used in training the hold bot to improve system selection and resource usage during future instances of a given customer issue. The information can also be used, in some implementations, to provide feedback and expertise scoring for the human agent in determining future agent selections associated with similar customer issues and intent values for a communication (e.g., as analyzed when selecting a human agent in block 720 of a process illustrated by flowchart 700).

In another example, a hold bot can be used with an automated scheduling system. For example, when a customer calls a system, a human agent can initially interact with a customer, but can place the customer on hold while the human agent researches available schedule times for the contact the customer is attempting to schedule time with. In some such implementations, a hold bot can be used to collect availability information from the customer, and match the customer availability with contact availability to dynamically suggest appointment times. If issues arise with automated scheduling, the hold bot system can allow a customer voice message to be converted to text and provided to the human agent, indicating the need for further interactions or issues with the appointment times suggested by the automated system.

In another example, a customer can call to dispute a transaction associated with a purchase. In such an example, the customer may be placed on hold while a human agent gathers information about the purchase, and initiates the process to dispute the transaction. During a hold status while the human agent initiates the dispute process, the customer may recognize that the transaction was actually authorized, and that the customer does not want to initiate the dispute after all. Rather than waiting for the human agent to initiate the dispute, the hold bot can allow the customer to speak a voice message indicating "I realized what the transaction was, and don't want to dispute the transaction after all". The message can be converted by a voice to text system to a text message that is presented to the human agent. In some systems, this can simply allow the human agent to end the hold status and resume a voice interaction. In other systems, machine processing can be used to provide additional system support, such as automatically interrupting the human agents process to initiate the dispute based on machine analysis of the customer communication.

In various implementations, tens, hundreds, or many thousands of instances of processes associated with flowchart 700 may be facilitated simultaneously by a communication system to support different real-time two way communications for customers (e.g., users) to respond to customer issues on behalf of one or more clients (e.g., merchants or merchant systems). A single communication server or communication system can thus perform operations of flowchart 700 for a first user communication while simultaneously (e.g., at the same time) performing operations of flowchart 700 for any number of other user communications.

Throughout such operations, the interactions supported by the system described in flowchart 700 can include voice-to-voice, voice-to-text, and text-to-text communications supported by STT and TTS systems in a connection management server described above. This can include changes between communications at any point in flowchart 700. In some implementations, such functionality can be supported by a hold bot, which can allow a user to indicate a request to switch from voice to text, or from text to voice. Similarly, an agent may interact in either voice or text as part of a two way communication, and TTS and STT systems can handle the communication output to a user in the user's preferred format regardless of how a communication is initiated by an agent. Similarly, an agent can switch between inputting voice or text communications as needed to respond effectively to user communications.

Figure 8:
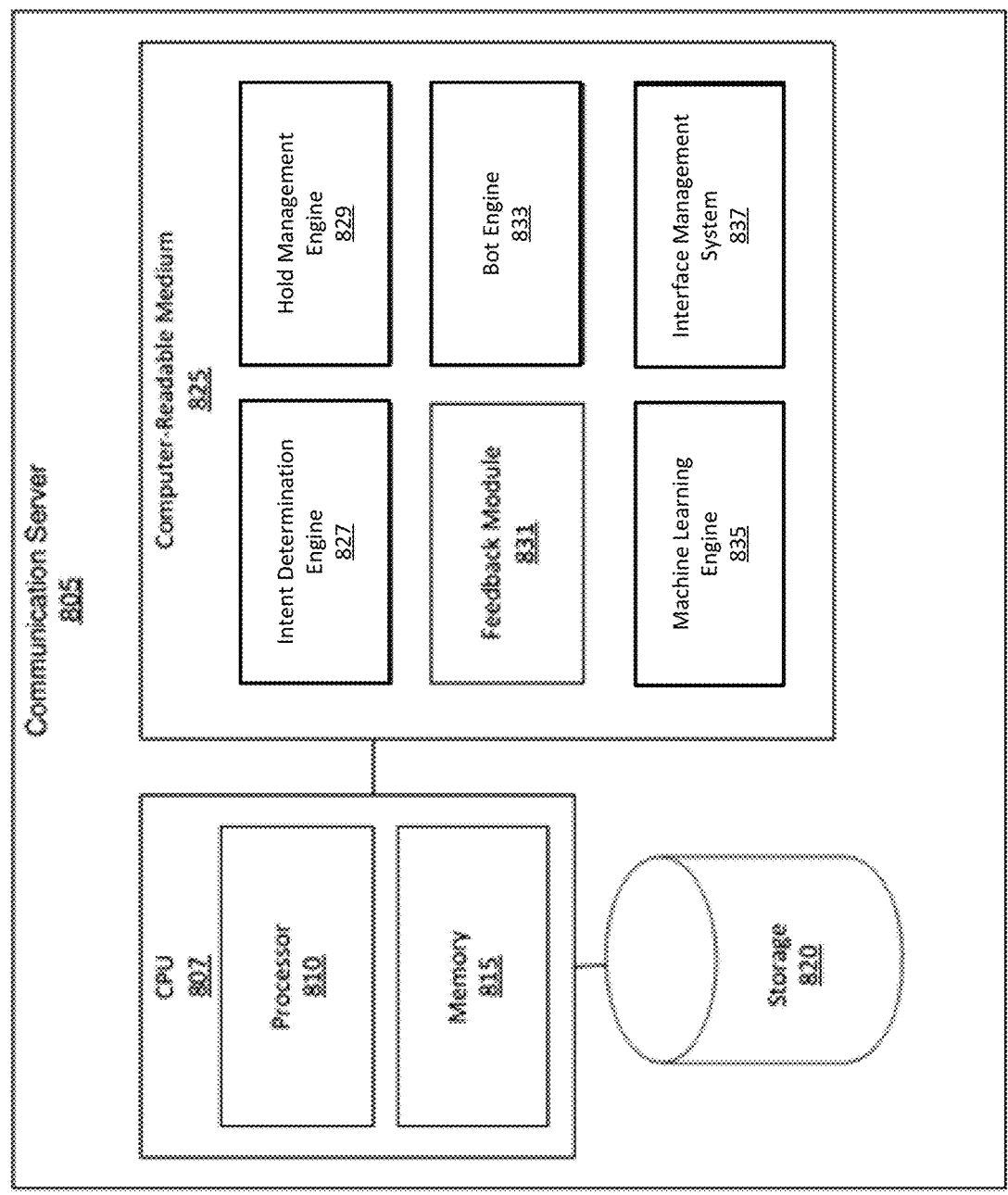
FIG. 8 shows a block diagram representing a communication that can be used in accordance with examples described herein.

FIG. 8 shows a block diagram of a communication server 805 according to some embodiments. The communication server 805 may illustrate the internal components of the communication server or system used to implement the process of flowchart 700 of FIG. 7, or any such system described herein. The communication server 805 may include a central processing unit (CPU) 807, including a processor 810 and memory 815. The communication server 805 may further include storage 820.

The CPU 807 may be coupled to a computer-readable medium 825. The computer-readable medium 805 may have any number of modules and engines. Although six modules and engines are illustrated, it is contemplated that fewer or greater modules or engines may be implemented in the computer-readable medium 825 to perform the functions described herein. As shown in FIG. 8, the computer-readable medium 825 may include an intent determination engine 827, a hold management engine 829, a feedback module 831, a bot engine 833, a machine learning engine 835, and an interface management system 837. In other implementations, other engines or modules may be used, or the functions implemented by communication server 805 can be combined or distributed in other ways.

The intent determination engine 827 may be configured to, in conjunction with the processor 810, receive a request for a conversation. The request may be received from a network device operated by a user. The request may be received at a terminal device operated by an agent, for example. The intent determination engine 827 may further be configured to, in conjunction with the processor 810, determine an intent for the conversation. The intent may be determined from the request. For example, the request may state, "I want my order status." The intent may be extracted from the request as "order_status". Intent data can also be determined from a customer account or identifier data gathered upon call receipt, such as when previous requests have been received from a device. Such data can be stored in storage 820 or other database structures and used with intent determination engine 827 or any other element of a communication system described herein.

Hold management engine 829 may include systems to both manage the hold status for communications handled by the communication server 805 and to manage transitions between a hold and an unhold (e.g., human agent interaction) status. For example, in some aspects, the hold can be associated with a binary computer telephony integration (CTI) hold/unhold indicator associated with the hold status. The CTI indicator can be set automatically by a system flow (e.g., flow 700) or manually by a human agent. Hold management engine 829 can monitor the CTI indicator associated with a two-way communication, and initiate actions based on a current CTI indicator status or a change in the CTI indicator status. For example, during a CTI indicator transition to a status indicating a hold, the hold management engine 829 can initiate operation of the bot engine 833, and can be used to track and monitor interactions between a customer and a bot as the hold status continues. CTI is one possible implementation of a hold/unhold indicator. In other implementations, other indicators can be used, such as Unicode Transformation Format (UTF) encoded signal. Such a signal and other such signals can further include JavaScript Object Notation (JSON), Extensible Markup Language (XML), or other such structured data in a signal to indicate a hold status. Any such signals (e.g., UTF JSON, XML, etc.) can be used as a flag to manage hold bot functionality as described herein.

During a transition from a hold status to an unhold status, the hold management engine 829 can manage connection of the customer to the human agent, including managing overlapping communications with a bot and a human agent using both bot engine 833 and a human agent interface of interface management system 837. For example, if a customer is providing personal information to the bot engine 833 when a human agent manually transitions a CTI indicator to an unhold status, the hold management engine 829 can manage the customer completing the interaction with the bot engine 833 so that the customer can complete the process of providing data, while at the same time connecting the human agent voice connection to the two-way communication using interface management system 837. In some implementations, the transition can place the human agent in a hold-like state while the customer is given a fixed period of time to complete the bot operation. In other implementations, the human agent is connected to the communication and can talk on the communication while the bot is still connected to the communication to finish receiving data from the customer.

Feedback module 831 may be configured to, in conjunction with the processor 810, receive feedback on the conversation. Such feedback can be fed into a machine learning engine 835 and an interface management system 837 to modify future operations of the system. The feedback may be provided by an agent operating the terminal device via interface management system 836, by an automated sentiment system, by a customer, or by any other such source. The feedback may be reflective of how well the hold bot functioned during the two-way communication, as well as feedback on any operation performed by communication server 805 or a human agent during the two-way communication. The feedback module 831 may also obtain feedback from the user engaged in the conversation. For instance, at the end of a conversation, the feedback module 831 may transmit, to the network device utilized by a user, a request to provide feedback with regard to its conversation with the hold bot and/or live agent. This request may be provided in the form of a survey, through which the user may indicate its sentiment with regard to the conversation, as well as provide a performance evaluation of the bot and/or live agent. In some instances, the feedback module 831 may obtain feedback from the user engaged in the conversation during the conversation. For instance, the feedback module 831 may evaluate user responses during the conversation to determine the sentiment of the user. For example, the feedback module 831 may analyze the textual or non-textual attributes associated with user messages to identify whether the user messages include an anchor associated with a polarity. As an illustrative example, if the user indicates, in a message, that it is "frustrated" or indicates that the proposed solution is incorrect (e.g., a "no" response, etc.), the feedback module 831 may determine that the message represents a negative polarity and, thus, determine that the bot failed to identify the intent and/or handle the request expressed by the user in a satisfactory manner. The feedback may be received in any suitable form. For example, the feedback may be expressed on a letter scale, on a number scale, through words, through selection of icons or graphics, and/or the like. The interface displayed to the agent and/or user to provide the feedback and to render the views of the conversation may be handled by the interface management system 837 in conjunction with the processor 810.

The machine learning engine 835 may be configured to, in conjunction with the processor 810, accept data associated with the conversation, identified intent, hold bot actions, or other actions of communications and provided feedback (e.g. into a database) and analyze the data to draw inferences about how well the hold bot and/or live agent handled the conversation. This data, along with other historical conversation data and feedback, may be used to build a model that may be used to determine a future intent associated with one or more future requests, and to update hold bot operations or flow (e.g. updating triggers for hold/unhold, hold bot data gathering, hold bot communications to a customer, etc.). For example, if a particular action of a hold bot successfully handled an "order_status" intent to the satisfaction of a user, future "order_status" intents may also be managed by instances of the hold bot in future communications in the same way. In addition, future requests stating "I want my order status" may be automatically correlated with the "order_status" intent based on positive feedback. However, if a particular type of bot unsuccessfully handled an intent to the dissatisfaction of the user, future intents similar to the aforementioned intent may be transferred to a terminal device in order for these future intents to be handled by a live agent or to another type of bot that may be better suited to handle the intent based on a confidence score for the other type of bot and calculated based on the intent. Such negative feedback for the action can cause the hold bot to not use the action in the future, or to use other actions first.

As an example, the first time a user contacts an agent with an intent of "delivery_status", during a hold status initiated by the agent, the hold bot may use a status function of the hold bot in real-time during the two-way communication (e.g., as part of the two-way communication). After the two-way communication is complete, the agent that managed transfer to the bot may provide feedback on one or more aspects of the interaction, such as whether the order status function of the hold bot effectively resolved the user issue, and whether or not the order status function of the hold bot was capable of resolving the intent, and the agents rating of how well the two-way communication proceeded when the order status bot was active. Further, the user may also provide feedback on similar or different aspects of the interaction, such as whether the order status function of the hold bot successfully resolved the user's intent, whether the order status bot was responsive to the user's messages, whether responses from the order status function of the hold bot were relevant to the intent and/or to the particular messages submitted by the user, and the like. Other techniques may be used to collect feedback regarding the interaction without explicit feedback from the agent and/or the user, such as by observing whether or not the agent had to intervene in the conversation during hold bot operation, which may indicate that the order status function of the hold bot was not effective. The feedback may be used to train a model in machine learning engine 835 that may be applied to future interactions. Such information may then be used to improve and manage functionality of a hold bot (e.g., machines used by or with the hold bot to manage specific intents or functions during a hold status). Updated adjustment will then be used dynamically for future selection of bot functionality associated with the same or similar input data (e.g., input matching or associated with "delivery status" or a delivery status intent identified by NLU). Such a model applied and initiated for incoming or future interactions while the communication server 805 is managing other two-way communications, such that feedback and machine learning updates from feedback module 831 and machine learning engine 835 for one communication can be performed while the communication server 805 is managing two way communications between users and human agents, and the updates can be dynamically applied to new communications in a communication server 805 while other communications proceed using the initial operations (e.g., not updated using feedback or machine learning updates).

In some implementations, communication server 805 can use intent determination engine 827 and interface management system 837 to select an option switch between a hold bot (e.g., as part of bot engine 833) and interaction with a human agent (e.g., using interface management system 837) dynamically and in real time (e.g., automatically) based on characteristics of the messages exchanged between the hold bot of bot engine 833 during a hold status. In some instances, voice messages provided from a user device to communication server 805 can be analyzed by bot engine 833 (e.g., following a voice to text conversion or other processes), to make an automated unhold or bot termination decision. Such an action can be based on operations of analyzing the text of a message to determine message characteristics (e.g., the message parameters) provided to the hold bot, and can include an analysis of textual or non-textual attributes associated with the message. For example, bot engine 833 can extract natural language meaning from voice information provided to the bot engine 833 to determine that the bot engine is not providing an adequate interaction with the customer, and can terminate the hold bot operation automatically, leaving the customer in a hold state without options for bot interaction until the human agent associated with the communication returns to the communication (e.g., switches the communication from a hold to an unhold status). When an automated ending to the hold bot interaction occurs, the interface management system 837 can send a priority message to the human agent indicating that the hold bot is no longer interacting with the customer, and allowing the human agent to take appropriate responsive action. Such action can include a brief unhold status to provide an update to the customer, triggering additional bot hold functionality or separate hold functionality, such as an expected wait time message or an option for an automated call-back, or other such system functionality operations.

Examples of an text that can initiate a termination of hold bot functionality can include a string of text or voice to text data associated with a negative customer experience or polarity (e.g., sentiment or intent, with the words "frustrated" and "unhappy" corresponding to a negative polarity or frustrated polarity, the word "happy" corresponding to a positive polarity, and so on). Such terms can, in some implementations, be client specific for different systems (e.g., merchant systems) utilizing a communication server. For example, a term "dispute" for one client can be negative, but can be neutral or positive for a second client. In some instances, anchor terms or trigger terms can be dynamically determined using supervised machine learning techniques. For example, one or more clustering algorithms can be executed on stored messages to find patterns within the stored messages. The clustered messages can be further filtered and evaluated to determine the anchor. Further, one or more words near the identified anchor can be parsed for amplifiers. An example of an amplifier is a term that increases or decreases an intensity associated with the polarity of the anchor, such as "really," "not really," "kind of," and so on. The characteristic can include, for example, the speed of typing, the number of special characters used in the message (e.g., exclamation points, question marks, and so on), a semantic analysis of a message (e.g., by identifying keywords, sentence structures, repeated words, punctuation characters and/or non-article words); user input (e.g., having selected one or more categories); and/or message-associated statistics (e.g., response latency).

As a non-limiting example, the message parameter can be a numerical value that indicates the high intensity of the negative polarity (e.g., a message parameter of 20 on a scale of 0-100, with lower numbers indicating a negative polarity and higher numbers indicating a positive polarity). An algorithm can be used to calculate the message parameter. For example, the algorithm may be based on supervised machine learning techniques. In a further example, if the term "kind of" is near the anchor "don't like" (e.g., as in the sentence "I kind of don't like"), the term "kind of" may be identified as an amplifier term that indicates a medium intensity of the negative polarity. In this case, a message parameter can be generated based on the identification of the medium intensity of the negative polarity. As a non-limiting example, the message parameter can be a numerical value that indicates the medium intensity of the negative polarity (e.g., a message parameter of forty out of one hundred, as opposed to the message parameter of twenty). In some instances, the message parameter can be used to determine which secondary queue is to store the communication.

In some implementations, the characteristic of a message can be the sentiment associated with the message. The message parameter can represent the sentiment of the message. For example, if the sentiment of the message is happy, the message parameter can be a certain value or range of values, whereas, if the sentiment of the message is angry, the message parameter can be another value or range of values. Determining whether to terminate hold bot functionality can be continuously and automatically updated with each new message received at communication server as part of a two-way communication while a hold bot is interacting with a customer.

In some implementations, the machine learning engine 835 may be used not only to manage algorithms associated with hold bot functionality (e.g., prioritization and/or use of functionality for different intent and sentiment scores for a given communication), but can also be used to select between different available human agents (e.g., based on human agent expertise or system scores associated with intents and sentiments for a given communications). In some aspects, a hold bot may include functionality to manage switching between human agents. For example, data provided to a hold bot during a hold status may indicate that a different human agent is more appropriate for a given communication. In some implementations, a hold bot can automatically initiate and manage such a transfer between human agents. In other implementations, a hold bot can generate a transfer recommendation in response to data provided to the hold bot, and can use an interface management system (e.g., system 837) to recommend the transfer to the human agent associated with a given communication, allowing the human agent to initiate the transfer based on the hold bot recommendation. Such recommendations can be based on machine learning feedback and a machine learning algorithm that processes data received by the hold bot, or can operate as part of a hold bot. The machine learning model or artificial intelligence algorithm may be trained using feedback associated with previously conducted conversations between users and live agents. This feedback may be used to identify certain characteristics for each agent. These characteristics may include, but are not limited to, areas of expertise associated with technical issues, responsiveness to particular sentiments (e.g., ability to reduce user frustration or anger, etc.), response latency, user satisfaction rating or score, and the like. If a hold bot terminates interactions with a customer due to a trigger (e.g., a sentiment score reaching a threshold level), the communication system may use the machine learning model or artificial intelligence algorithm to select a particular agent that may intervene in the conversation and provide an increased likelihood of a positive user experience.

In some implementations, the communication server 805 uses feedback from the network device (e.g., customer device) in feedback module 831 to train or update the machine learning model or artificial intelligence algorithm used to select an agent for intervention in a conversation between a network device and a bot. For instance, if the network device provides feedback indicating a negative experience with the selected agent, the communication server may update the machine learning model or artificial intelligence algorithm to reduce the likelihood of the agent's selection for a conversation having identical or similar characteristics to the conversation associated with the received feedback. Alternatively, if the network device provides feedback indicating a positive experience with the selected agent, the communication server may update the machine learning model or artificial intelligence algorithm to further reinforce the agent's ability to positively address identical or similar conversations.

In some implementations, a bot engine 833 operating during a hold status may recommend or predict responses to messages received from network device that can be used by a human agent during a hold status or at a status transition from a hold status to an unhold status. For example, interface management system 837 may display an automated update of interactions between a hold bot of bot engine 833 and a customer device, and may recommend actions to be taken by a human agent. This can include bot human agent triggering of additional hold bot functionality (e.g., initiating a hold bot communication recommending the customer select hold bot functionality, such as accessing automated assistance data, scheduling functionality, transfer functionality, etc.). The recommendation to the human agent can also include operations that can be performed following a communication status change to an unhold status, such as recommending a script or set of actions the human agent can use as part of the two-way communication with a customer. Machine learning engine 835 can be used with feedback module 831 to analyze the efficacy of recommended actions, and alter the future use of such recommendations in existing two-way communications or future two-way communications.

Figure 9:
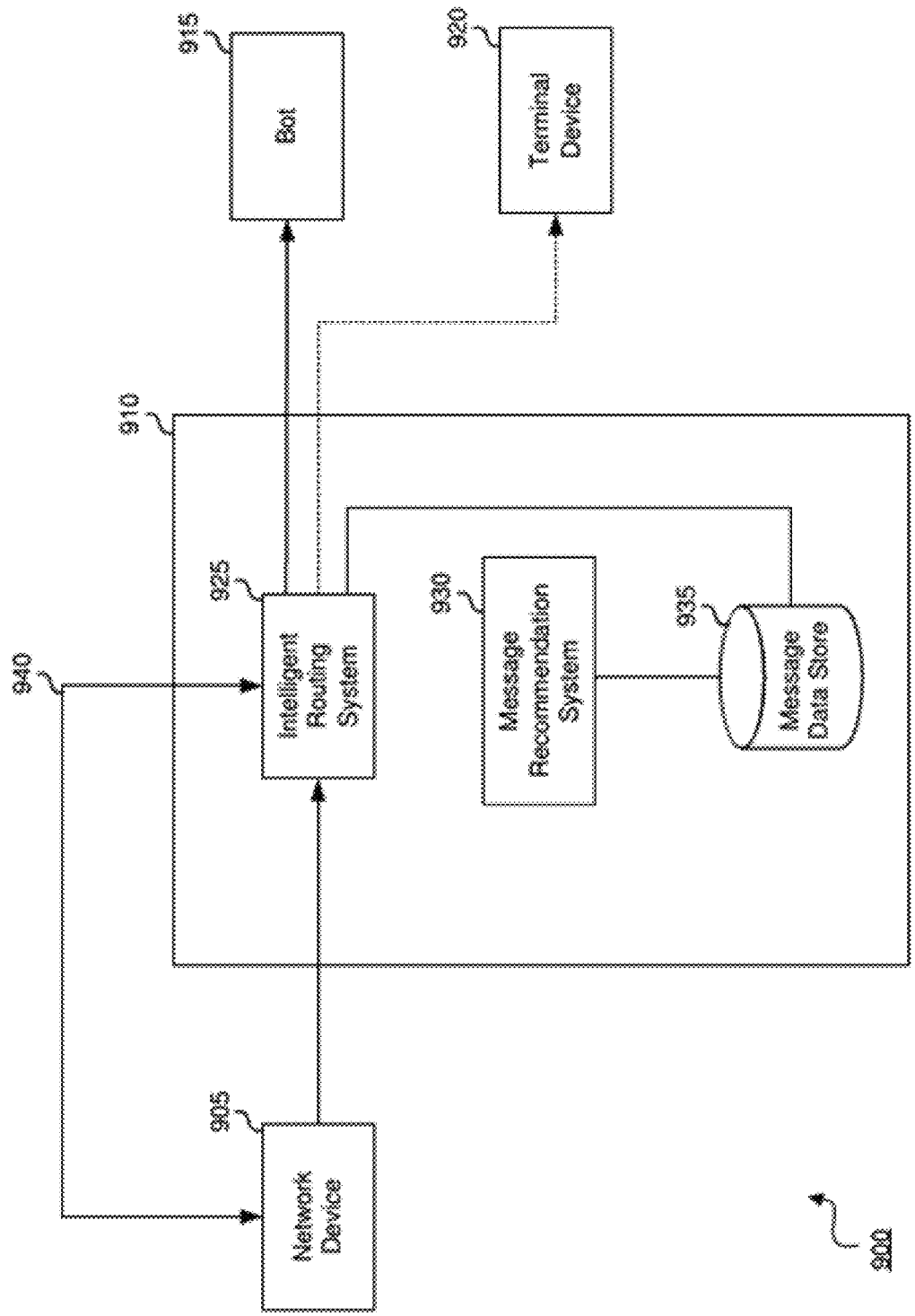
FIG. 9 shows a block diagram representing a network environment for feedback using machine-learning techniques in accordance with examples described herein.

FIG. 9 shows a block diagram representing network environment 900 for enhancing endpoint selection (e.g., selection of a particular human agent as part of operation 720, 722, or 724 of flowchart 700, or determination of whether to use an initial hold bot interaction as part of operation 718 of flowchart 700, etc.) using machine-learning techniques. Network environment 900 may include network device 905 (operated by a user) communication server 910, bot 915 and terminal device 920. Communication server 910 can facilitate the establishment of a communication channel that enables network device 905 and at least one bot 915 and terminal device 920 to communicate.

Communication server 910 may include intelligent routing system 925, message recommendation system 930, and message data store 935. In such a system, intelligent routing system 925 can include analysis of initial or existing data associated with a communication to select hold bot functionality or a particular human agent from a human agent pool to be used for a given two-way communication. Each of intelligent routing system 925 and message recommendation system 930 may include one or more computing devices with a processor and a memory that execute instructions to implement certain operations. In some implementations, intelligent routing system 925 may be a bot configured to implement a hold system with a hold bot as described herein. Intelligent routing system 925 may include one or more processors configured to execute code that causes one or more machine-learning techniques or artificial intelligence techniques to provide dynamic feedback a hold bot for selection of hold bot functionality as part of communication operations in conjunction with real-time intelligent routing of messages. In some implementations, intelligent routing system 925 can execute one or more machine-learning techniques to train a model that predicts whether a message received from network device 905 may be successfully addressed by a bot 915.

As a non-limiting example, intelligent routing system 925 may receive a message from network device 905 through a communication channel established or facilitated by communication server 910 (e.g., a native application configured to enable users to communicate with each other across various devices). Intelligent routing system 925 may evaluate the incoming message according to certain embodiments described above (e.g., intent and/or sentiment scoring). For example, intelligent routing system 925 may evaluate the content (e.g., text, audio clips, images, emoticons, or other suitable content) included in the received message using a trained machine-learning model to identify an intent and/or a sentiment. The input data (e.g., communication text and/or intent data) can be analyzed to determine whether to use an initial hold status with hold bot functionality, or to direct the initial contact to a given human agent. For example, communications with a low sentiment score (e.g., indicating frustration), can be routed to a human agent specializing in addressing low-sentiment score communications. The determination made by the system 925 is used to direct the communication. Data from the intelligent routing can be stored in message data store 935 and integrated with various feedback systems using message recommendation system 930.

In some implementations, intelligent routing system 925 may request an acknowledgement from network device 905 of the predicted destination. As a non-limiting example, intelligent routing system 925 may evaluate the message using a machine-learning technique, and a result of the evaluation may include a prediction that bot 915 is the destination for the message. To confirm, intelligent routing system 925 may automatically request feedback signal 940. For example, feedback signal 940 may include a request for network device 905 to acknowledge whether bot 915 is the correct destination for the message (e.g., "Is Technical Support the correct destination?"). If network device 905 transmits the acknowledgement that bot 915 is the correct destination (e.g., the destination intended by the user operating network device 905), then intelligent routing system 925 may train the machine-learning model to predict that future messages including the exact or similar content (e.g., a threshold of similarity, such as 10 percent difference in content) as the received message are to be routed to bot 915. However, if intelligent routing system 925 receives feedback signal 940 indicating that bot 915 is not the correct or intended destination for the received message, but rather terminal device 920 is the correct or intended destination, intelligent routing system 925 can train the machine-learning model that future messages including the exact or similar content as the received message are to be routed to terminal device 920 (instead of bot 915). In some implementations, intelligent routing system 925 may not immediately update or train the machine-learning model to route future messages to terminal device 920, but rather, intelligent routing system 925 may wait for a threshold number of incorrect routings to bot 915 before routing all future messages with the exact same or similar content as the received message to terminal device 920.

Message data store 935 may store some or all messages received in the past from one or more network devices. Further, message data store 935 may also store some or all messages transmitted by terminal devices or bots during previous communication sessions with network devices. Message data store 935 may also store some or all messages transmitted by network devices to bots during communication sessions. Further, message data store 935 may store some or all messages transmitted by bots to network devices during communication sessions. In some implementations, message data store 935 may be a database of all messages processed (e.g., transmitted by or received at) communication server 910.

Message recommendation system 930 may analyze the database of messages stored at message data store 935. In some implementations, message recommendation system 930 may evaluate the messages stored at message data store 935 using one or more machine-learning algorithms or artificial intelligence algorithms. For example, message recommendation system 930 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of messages stored in message data store 935. In some implementations, a recurrent neural network (RNN) or a convolutional neural network (CNN) may be used to predict response messages to assist the agent. In some implementations, message recommendation system 930 may use support vector machines (SVM), supervised, semi-supervised, ensemble techniques, or unsupervised machine-learning techniques to evaluate all previous messages to predict responses to incoming messages received from network devices during communication sessions. For example, message recommendation system 930 may evaluate the content of messages received from network devices (or messages received at communication server 910 from bots or terminal devices) and compare the results of the evaluation to the one or more clusters of previous messages stored in message data store 935. Once the cluster is identified, message recommendation system 930 can identify the most relevant response messages based on a confidence threshold. For example, an incoming message (e.g., received at communication server 910 from network device 905) may correspond to a technical issue based on the content of the incoming message. Message recommendation system 930 can identify that the incoming message corresponds to a technical issue based on an evaluation of the content of the incoming message (e.g., text evaluation). Message recommendation system 930 can access message data store 935 to identify the cluster of messages associated with technical issues. Message recommendation system 930 can select one or more response messages within the cluster of messages based on a confidence threshold. As a non-limiting example, a confidence algorithm can be executed to generate a confidence score. A confidence score may be a percentage value where the lower the percentage, the less likely the response is a good prediction for the incoming message, and the higher the percentage, the more likely the response is a good prediction for the incoming message. A minimum confidence threshold may be defined as a measure of certainty or trustworthiness associated with each discovered pattern. Further, an example of a confidence algorithm may be the Apriori Algorithm, similarity algorithms indicating similarity between two data sets, and other suitable confidence algorithms. Such functionality can be included in hold bot functionality or other system operations, for example, in an initial analysis of a communication that can be performed by a hold bot as a communication session is established, or at selected points in a communication.

Figure 10:
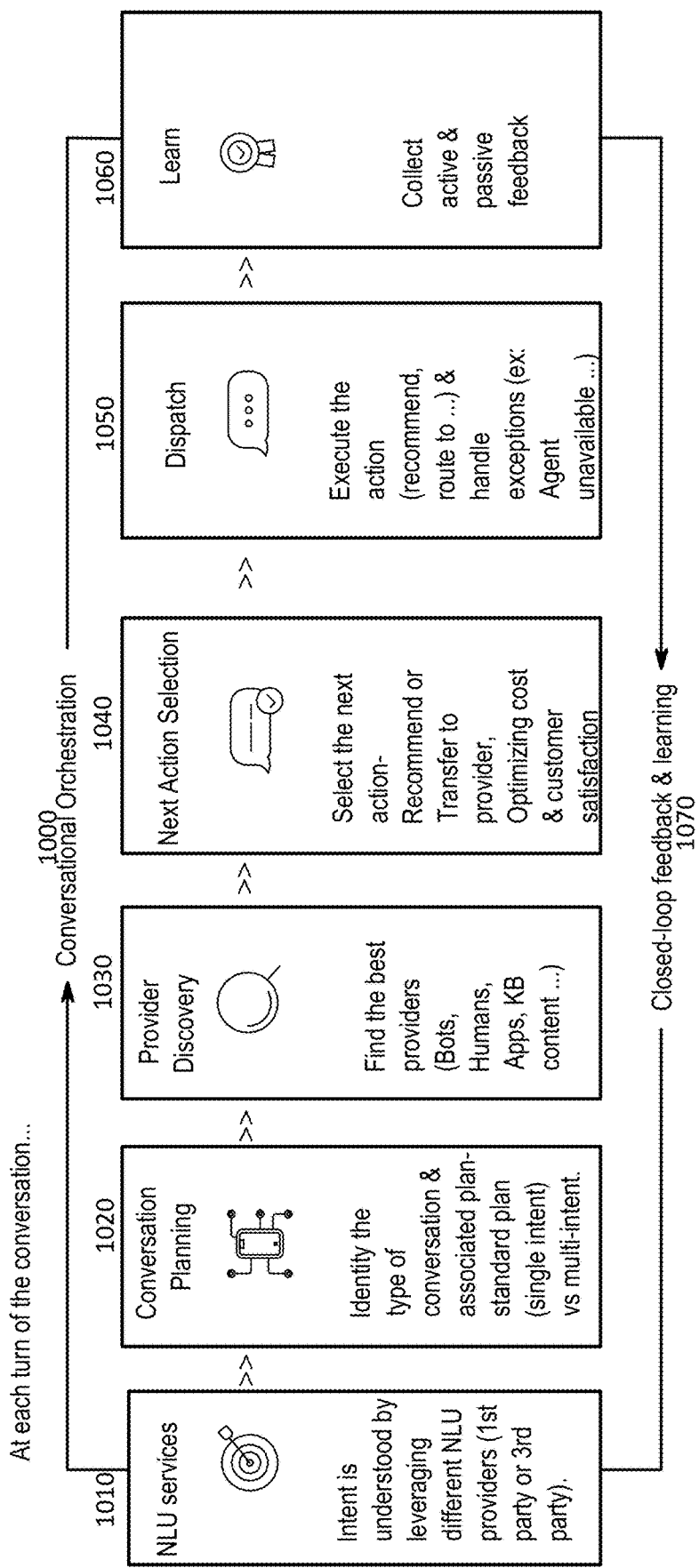
FIG. 10 illustrates aspects of a two-way communication session and associated input data used for merged transcripts in accordance with examples described herein.

FIG. 10 illustrates aspects of a two-way communication session and associated input data in accordance with examples described herein. FIG. 10 illustrates aspects of hold bot usage and feedback (e.g., using machine learning with feedback) to improve hold bot operation in accordance with aspects described herein. In the chart of FIG. 10, input data 1010 (e.g., a user input as part of a two-way communication) is received. In some examples, the user input is text data, but in other examples, the user input can be any such data. In some examples, a standard interface or initial interaction menu (e.g., verbal instructions requesting a verbal or number response to direct a next action). Depending on the particular implementation, a direct response or a set of options can be processed by a system. For a menu tree (e.g., options 1 through N provided via an instruction communication), a menu response or path selection can be received in operation 1020 and followed, with conversation orchestration 1000 (e.g., feedback and analysis) performed for a selected conversation turn, which may be in real-time, at a given state of a communication, or after completion of the communication. For a natural language input from a customer, a plurality of bot operations 1020 can be queried for confidence scores. When the confidence scores are received, they are used to generate a table or analysis of comparative scores 1030. In operation 1040, the comparative scores are analyzed and used to select a next action, which can be selection of a hold bot function, termination of hold bot functions during the remainder of a hold status or the remainder of a two way communication, transfer to an agent (e.g., automatic termination of a hold status), or other such actions. In operation 1050, the selected action is executed. Information about communication operations are gathered in operation 1060, and then used to facilitate the two-way communication. The facilitation can involve redirecting the two-way communication to the selected bot function, terminating hold bot operation for a fixed period, a current hold status, or a remainder of a two-way communication, or other such operations. Information about the selected bot can be gathered in real-time during the two-way communication to be used for machine learning or other feedback mechanisms in operation 1070 to update the bot mapping for the selected bot. The feedback information can include metadata, surveys, or analysis of the data in the two-way communication.

In some aspects input data for each turn (e.g., conversation orchestration 1000) results in a set of conversation orchestration operations. Input data for a turn is initially processed by NLU services. Such NLU services can identify intent values, keywords, or other such input data. Intent values can be generated by leveraging one or more NLU services, including local NLU or remote NLU services. Such NLU analysis is performed in real-time or near real-time, such that an NLU analysis for one turn can be in processes when another turn occurs, and the additional turn can be integrated with an in process NLU analysis for the two-way communication, or an additional NLU analysis can occur for the new turn in real-time. NLU data (e.g., intent values) is then used in conversation planning. Conversation planning can use the NLU data from NLU services to identify a conversation "type" or a response plan. Additionally, conversation planning can identify a multi-intent two-way communication (e.g., where a user wants to both schedule a new appointment and receive a list of previously made appointments, or take any such plurality of different actions which may use different system services such as multiple different bots). Conversation planning may identify a script from an initial intent identified by NLU services or an initial bot to manage gathering of additional information or support to facilitate the two-way communication.

Feature discovery can then be dynamically performed to identify the best resources for the two-way communication based on the conversation planning and NLU data from NLU services. Feature discovery can include the operations described above to identify features of a hold bot for use based on existing sentiment, intent, human agent selection, or other such data for a communication. Feature discovery can additionally compare the identified hold bot features with additional options, such as human agents associated with the NLU data (e.g., agents with specialized information associated with an intent), non-bot applications that may facilitate the two-way communication, informational content for an agent or customer, or other such data. Various criteria may be used to determine when to provide non-bot resources to a customer rather than identified hold bot features.

Resources used by a hold bot can be executed in dispatch operations. The dispatch operations can include routing a customer to a connection with a selected feature, providing identified information to a customer, requesting information from a customer, performing voice-to-text or text-to-voice services for communications to a human agent interface during a hold status, or any other such actions. Operations from NLU services can occur dynamically in real-time, which includes multiple such threads occurring simultaneously if a user takes multiple turns (e.g., provides multiple NLU responses, such as requesting multiple options from the possible services, such as scheduling, purchase assistance, product troubleshooting, etc.). Conversation planning can, for example, manage presentation of multiple different resources in a multi-intent communication, as well as managing feedback on resources used in a communication (e.g., re-planning when a user provides negative feedback on a dispatched bot). The real-time nature of the conversation orchestration allows a customer to receive responses quickly as part of a two-way communication, and the dynamic nature allows the conversation orchestration to adapt or respond to multiple turns from a customer in the two-way communication during hold bot operations. Features identified through feature discovery can provide efficient responses to standard customer requests, and dynamic analysis with NLU services during hold bot interactions for a hold status of a communication. Feedback and machine learning analysis of system operation can be used to improve the efficiency a system and the quality of information and services provided to a customer during a hold status of a two-way communication system.

Learning operations can collect active and passive feedback from each turn of conversation orchestration 1000, as well as aggregated data (e.g., text, metadata, agent analysis, customer polling data, etc.) for system operation. As described above, such information can be used by the system to improve each step of conversation orchestration 1000. Examples described herein particularly use feedback from learning operations. The real-time feedback allows data from a first two-way communication to inform the selection of hold bot functionality in a second two-way communication that is occurring at the same time as the first two-way communication. As soon as feedback from the first two-way communication is received, the selection process (e.g., mapping, scores, etc.) can be updated to reflect the feedback, and to provide the hold bot feature selection criteria for the second two-way communication if an associated input is received that analyzes the same communication details (e.g., intent, sentiment, history data, etc.) in a discovery operation for a turn of the second two-way communication.

Figure 11:
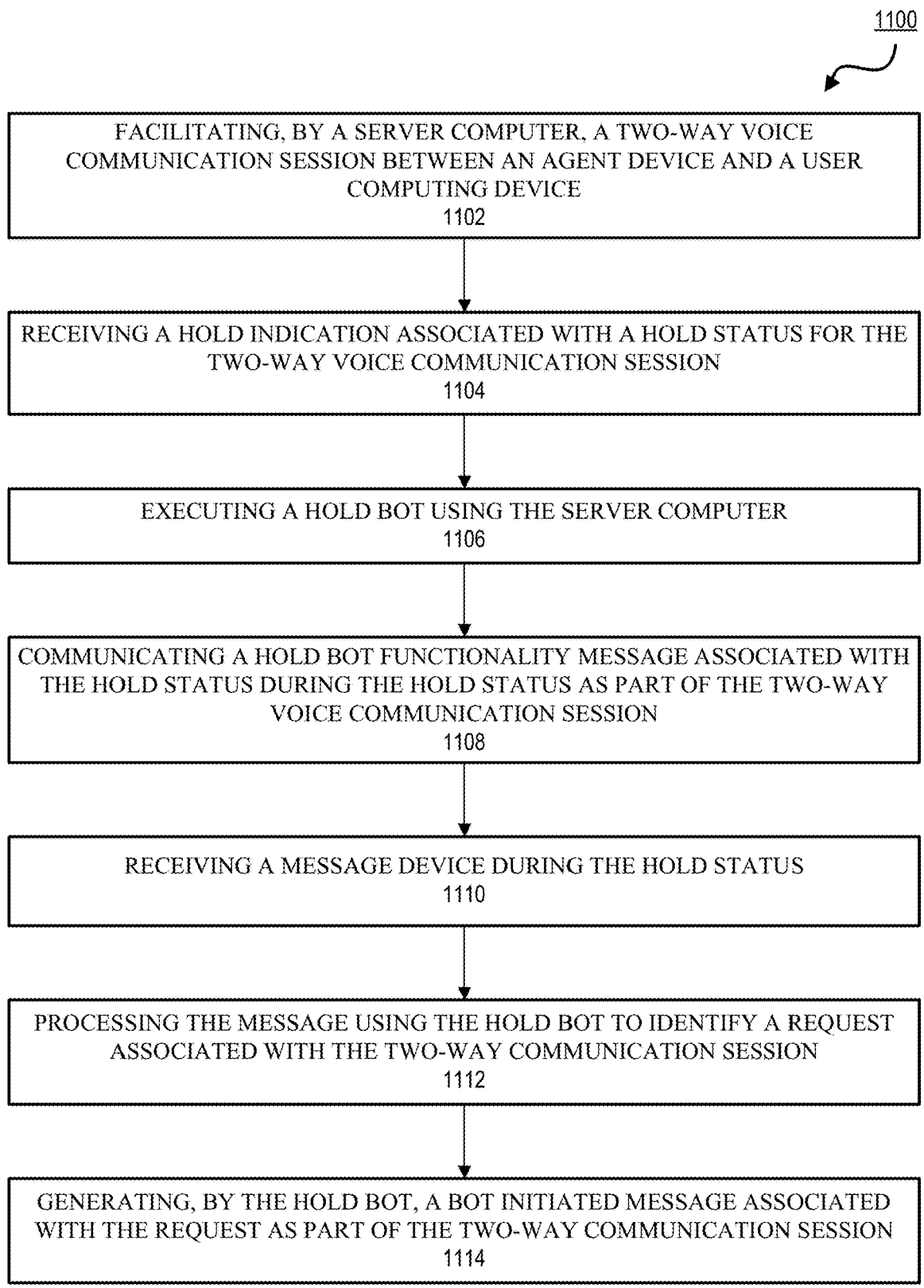
FIG. 11 is a flowchart of a method for communication system operations with hold bot functionality in accordance with examples described herein.

FIG. 11 is a flowchart of a method 1100 for operation of a communication system with hold bot functionality in accordance with examples described herein. Method 1100 can be implemented by any device participating in a two-way communication, such as a connection management system 150 or 450, an interaction management engine 625, a communication server 710 or 805, or any other such device including a memory and one or more processors configured to perform method 1100. In some examples, an agent terminal or user device can integrate the functionality for method 1100. In some examples, method 1100 is implemented as instructions stored in a non-transitory computer readable medium that, when executed by one or more processors of a device, cause the device to perform operations comprising method 1100.

Method 1100 includes operation 1102 which involves facilitating, by a server computer, a two-way voice communication session between an agent device and a user computing device.

Method 1100 includes operation 1104 which involves receiving a hold indication associated with a hold status for the two-way voice communication session;

Method 1100 includes operation 1106 which involves executing a hold bot using the server computer.

Method 1100 includes operation 1108 which involves communicating a hold bot functionality message associated with the hold during the hold status as part of the two-way voice communication session.

Method 1100 includes operation 1110 which involves receiving a message device during the hold status.

Method 1100 includes operation 1112 which involves processing the message using the hold bot to identify a request associated with the two-way communication session.

Method 1100 includes operation 1114 which involves generating, by the hold bot, a bot initiated message associated with the request as part of the two-way communication session.

One additional example may function in accordance with method 1100, where the message from the user computing device includes a voice message received while the two-way voice communication session is in the hold status, wherein processing the message comprises generating a text message from the voice message using a voice-to-text system, and wherein generating the bot initiated message comprises transmitting the voice to text message to agent while the two-way voice communication session is in the hold status.

One additional example may function in accordance with method 1100 further comprising receiving a text response to the bot initiated message, wherein when the text response is received from the agent device, the text response is converted to a voice response as part of the two-way communication session during in the hold status.

One additional example may function in accordance with method 1100, the hold bot functionality message comprises instructions for providing user data to a database system, wherein the message comprises the user data associated with the user computing device, and wherein the bot-initiated message comprises a formatted translation of the user data configured to update the database system with the user data associated with the user computing device.

One additional example may function in accordance with method 1100 further comprising transmitting a record of hold bot interactions to the agent device in real-time during the hold status, receiving an end hold indication associated with an end to the hold status for the two-way voice communication session, and terminating the transmission of the record of real-time hold bot interactions at an end of the hold status.

One additional example may function in accordance with method 1100, the message comprises a rescheduling message, wherein the bot initiated message comprises an automated rescheduling message to a scheduling system and a notification message, and wherein when the notification message is received by the agent device, the two way voice communication session is automatically terminated when the agent device does not respond to the notification message within a threshold time period.

Figure 12:
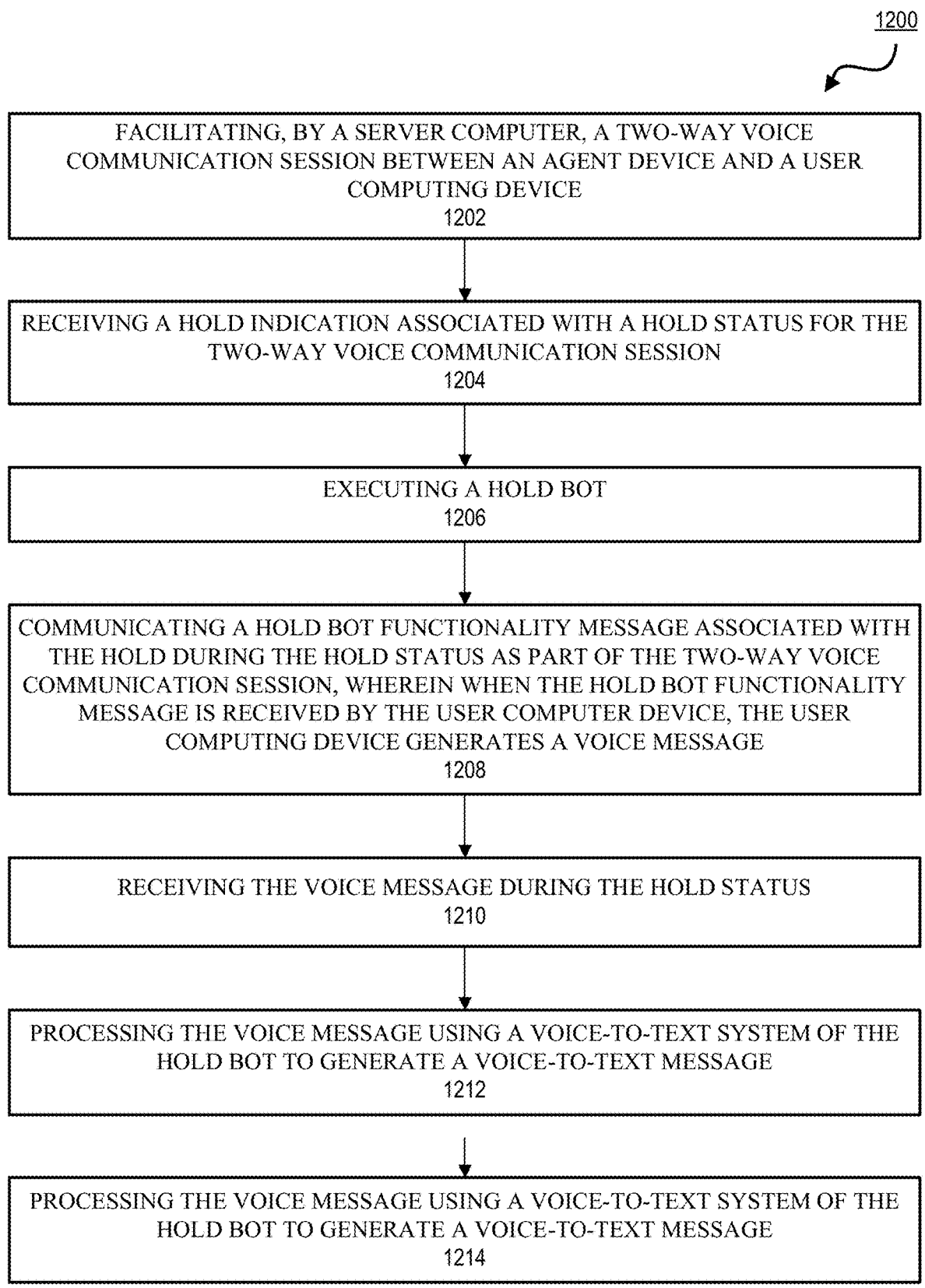
FIG. 12 is a flowchart of a method for communication system operations with hold bot functionality in accordance with examples described herein.
Figure 13:
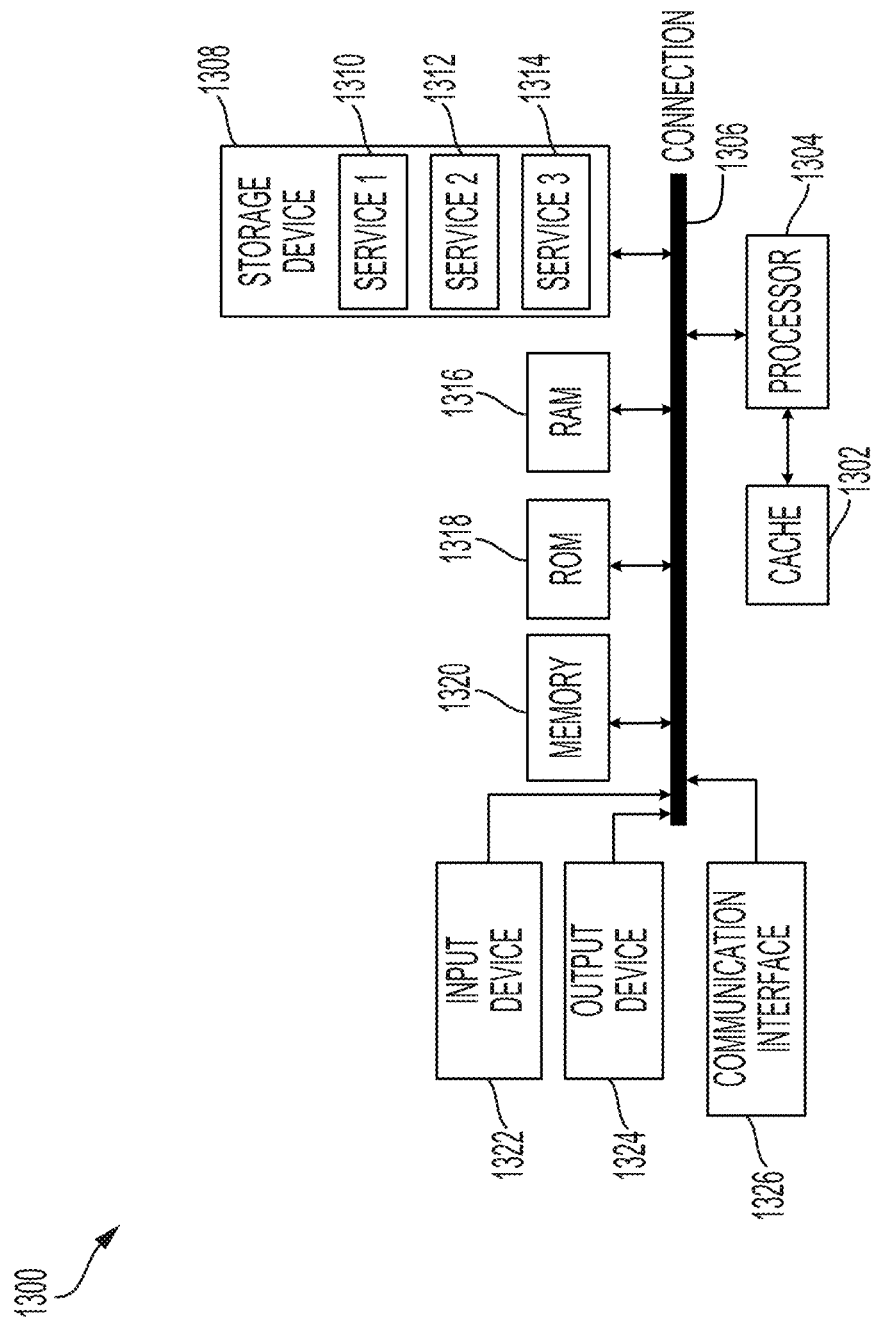
FIG. 13 is an example of a computing device that can be used to implement devices in a two-way communication system with hold bot functionality in accordance with examples described herein.

FIG. 12 is a flowchart of a method 1200 for operation of a communication system with hold bot functionality in accordance with examples described herein. Method 1200 can be implemented by any device participating in a two-way communication, such as a connection management system 150 or 450, an interaction management engine 625, a communication server 710 or 805, or any other such device including a memory and one or more processors configured to perform method 1200. In some examples, an agent terminal or user device can integrate the functionality for method 1200. In some examples, method 1200 is implemented as instructions stored in a non-transitory computer readable medium that, when executed by one or more processors of a device, cause the device to perform operations comprising method 1200.

Method 1200 includes operation 1202, which involves facilitating, by a server computer, a two-way voice communication session between an agent device and a user computing device.

Method 1200 includes operation 1204, which involves receiving a hold indication associated with a hold status for the two-way voice communication session;

Method 1200 includes operation 1206, which involves executing a hold bot. In some aspects, the hold bot can be executed by a server computer performing the operations of method 1200. In some aspects, portions of the hold bot can be managed by a server performing the operations of method 1200, with calls to functionality managed by the hold bot that are performed by networked resources separate from the server. In some aspects, the hold bot can include a variety of services and functionality integrated into a single hold bot. In some aspects, the hold bot can include a set of decision tree elements used to call additional functionality or additional bot services that operate as separate bots providing functionality through the hold bot operating during a hold status of a computing device.

Method 1200 includes operation 1208, which involves communicating a hold bot functionality message associated with the hold during the hold status as part of the two-way voice communication session, wherein when the hold bot functionality message is received by the user computer device, the user computing device generates a voice message;

Method 1200 includes operation 1210, which involves receiving the voice message during the hold status, processing the voice message using a voice-to-text system of the hold bot to generate a voice-to-text message, and transmitting the voice-to-text message, wherein when two-way voice communication is in the hold status, the agent device receives the voice-to-text message.

One additional example may function in accordance with method 1200 further comprising receiving a text message and processing the text message using a text-to-voice system of the hold bot to generate as a real-time audio response to the voice message during the hold status.

One additional example may function in accordance with method 1200 further comprising processing the voice message using a natural language processing system of the hold bot to identify an intent associated with the voice message, identifying a hold bot response system associated with the intent, and dynamically communicating instructions associated with the hold bot response system when a human agent response to the voice-to-text message is not received within a threshold period of time during the hold status.

One additional example may function in accordance with method 1200 wherein the hold indication is a binary computer telephony integration (CTI) hold/unhold indicator associated with the hold status.

One additional example may function in accordance with method 1200 further comprising storing details of the two-way voice communication in an interaction database, processing the details of the two-way voice communication in real-time to dynamically select an intent value for the two-way voice communication, process the voice message in real-time to update the intent value and to generate a hold status intent value separate from the intent value for the two-way communication, transmit the intent value and the hold status intent value. In various aspects, the interaction database can store a record of information from the communication, previous communications with the same customer or associated with a shared customer identifier or communication identifier, or other such related data. In further aspects, sentiment values, updated process or flow details from feedback and machine learning, or other such information can be used in such an example.

One additional example may function in accordance with method 1200 further comprising streaming an audio message from the hold bot as a response to the voice-to-text message as part of the two-way voice communication interrupting the audio message during transmission when the hold status ends during streaming of the audio message. The streaming audio message can, in some aspects, be text-to-voice data generated by the system in response to a typed message from a human agent. In some aspects, the streaming audio can be a pre-structured standardized message for a given response to a category of customer request. For example, when a customer provides a message to a human agent during a hold status, the message can be analyzed to either generate an automatic audio message in response, or the human agent can review text associated with the response and select from a predetermined set of audio responses to send to the customer during the hold status (e.g., which is a simplified action for the human agent as opposed to ending a hold status and communicating directly with the customer).

One additional example may function in accordance with method 1200 further comprising communicating an audio message generated the hold bot as a response to the voice-to-text message as part of the two-way voice communication, and communicating audio interrupting the audio message during transmission when the hold status ends during streaming of the audio message.

In various implementations, any number of operations of method 1200, or other operations can be performed simultaneously. As described, a single system or communications device can perform thousands of such operations per second or more. In various devices, as a user interacts with a system, and the system analyzes the user inputs as feedback, the system can use such feedback for real-time dynamic adjustments to system operation, such that inputs from a user can be used as feedback to alter system operation while the user continues to interact with the system or device.

Specific details are given in the above description to provide a thorough understanding of the embodiments. However, it is understood that the embodiments can be practiced without these specific details. Some examples, including the examples of methods 1100 and 1200 can be practices with repeating operations and intervening operations. Additionally, a system or device can operate hundreds or many thousands of instances of such methods simultaneously. For example, a system can operate one instance of method 1200 for a first communication with a first customer device, while performing additional instances of the method 1200 at the same time for hundreds or thousands of other communication sessions with other customer devices.

As described herein, any bot, voice bot, or hold bot system in accordance with systems and methods above can be implemented as a generative artificial intelligence (AI) system. Such systems can include systems supported by large language models (LLM) trained from text. Such text can include feedback text generated as part of transcript merging systems described herein. In some aspects, such systems can be trained in real-time while the systems are being used to respond to user inputs. The generative AI system can generate language (e.g., voice or text) outputs in response to one user, while transcript data from another user is simultaneously being processed and used to update the language model the facilitates the generative AI system. Such generative AI systems can be used in place of or in combination with bot scripting systems as described herein which use fixed text scripts, rather than generative AI systems that generate responsive text from an LLM. Additionally, as described herein, a system can use multiple different generative AI systems with LLMs targeted for different contexts, such as user (e.g., client device) characteristics, two-way communication topic contexts, or other such communication specific context.

Additionally, not all details of every method are described. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments. Additionally, some examples can operate with repeated or intervening operations, and multiple instances of operations can occur with dynamic adjustments made in response to real-time feedback to update data for a bot score mapper to change adjustments to confidence scores and to change selections of resources (e.g., bots, articles, human agents, etc.) selected to facilitate a two-way communication.

Systems described herein can involve aspects of a two-way communication session and associated input data used with hold bot systems. Some such bot systems can be trained using data from prior communications with feedback training for large language models and associated generative artificial intelligence. Such generative AI systems can generate text or voice messages in response to inputs (e.g., language) from a customer device. Such inputs can be received via voice, text, or any electronic input. Generative AI outputs can then similarly be provided to a customer device via audio (e.g., text to voice machine language outputs), text, or any such communication channel. In some aspects, a hold messaging system can be implemented where bots (e.g., generative AI based on LLMs, script trees, etc.) interact with customers as part of hold bot messaging. Generative AI bot systems used with hold messaging can be trained using large language models systems as an implementation of hold bot model training.

Training data can include prior human agent interactions, prior AI interaction transcripts, and the post call survey collection data can then be stored as part of an LLM training dataset. Large language models (LLMs) are machine-learning systems to model language. Such models can be implemented using neural networks with billions of network parameter weights. In some aspects, the post call survey collection data can be used to label text in other parts of the merged transcript to allow LLM training to perform updates to the LLM used for the generative AI interactions with customers to include semi-supervised training (e.g., with the labeled text based on the feedback identifying certain interactions in the merged transcript as positive, negative, or associated with other characteristics that can be processed in different ways as part of LLM training). In some aspects post call survey information can be used to remove certain transcripts or portions of certain transcripts from the LLM training dataset. In other aspects, additional filtering can be provided by processing or filtering training data, such as removing data for agents having success or quality ratings below a certain threshold, or other such filtering. In some aspects, the data processing can sort data into different training datasets based on content, subject matter, client details, or other such criteria. For example, a system may categorize devices and interactions, and identify agents and generative AI systems targeted for improved performance associated with a characteristic of a user of the device. Processing of training data can be used to identify data associated with improved performance for certain user characteristics, and can sort data into different datasets for training different generative AI systems targeted for improved interaction with users having the characteristics.

In some aspects, bot training data from multiple different systems and customer interactions allows standardized data sets across many customers, including many customers with similar characteristics, including issues across merchants (e.g., clients), issues within a merchant segment, actions that correlate with different sentiment scores (e.g., actions that achieve better than expected results when a sentiment score is low or high), or other such actions. The use of standardized data for an LLM training dataset can allow a standard generative AI system, but can also be used in conjunction with targeted alternate systems with context specific training. For example, rather than the generation of specially customized scripts or for niche situations, some implementations may use multiple different generative AI systems, with different systems targeted for non-standard situations, and the system can use triggers or AI decision systems to switch between such different generative AI systems. Training and machine learning feedback can be used to identify when such systems are preferable, and can also be used to identify when such systems would be valuable but not available. Some such systems can use analysis triggers to prompt the generation of a targeted generative AI system using subsets of data from the LLM training dataset based on information from merged transcripts and analysis of information from post call survey collection.

In some implementations, the LLM training dataset(s) can be included in a database. The data from many different communications can be aggregated and analyzed together from such a database as part of the LLM training. As described herein, a variety of tags and annotation data can be used with merged transcripts to identify successful trends, to identify previously unrecognized solutions to issues, and to allow system customization and influence on expected generative AI interactions with users. Such information can, for example, identify problematic interactions and generate triggers to override generative AI responses or provide specific scripts for certain questions rather than generative AI information. AI systems can thus involve a mix of predefined scripts and generative output in response to user interactions from the device. For example, for identified paths where generative AI provides problematic responses, or when user inputs are identified as likely to result in undesired generative AI responses, predefined scripts can be triggered in place of generative language from a generative AI system.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
  establishing, by a server computer, a voice communication channel for a two-way voice communication session associated with an agent device and a user computing device;
  establishing, by the server computer, a text communication channel for text communications associated with the agent device and the user computing device;
  executing a hold bot;
  communicating a functionality message associated with a hold status, wherein when the functionality message is received by the user computing device, the user computing device generates a voice message;
  receiving the voice message during the hold status;
  processing the voice message using the hold bot, wherein the voice message is processed by determining a plurality of bot operations, querying the plurality of bot operations for confidence scores, and determining that a confidence score of a bot operation exceeds a threshold;
  generating a voice-to-text message when the confidence score exceeds the threshold;
  transmitting the voice-to-text message, wherein when two-way voice communication is in the hold status, the agent device receives the voice-to-text message and transmits a text message;
  processing, by the server computer, the text message, wherein the text message is processed by generating a real-time audio response to the voice message during the hold status; and
  transmitting the real-time audio response over the voice communication channel.

2. The computer-implemented method of claim 1, further comprising processing the voice message using a natural language processing system of the hold bot to identify an intent associated with the voice message;
  identifying a hold bot response system associated with the intent; and
  dynamically communicating instructions associated with the hold bot response system when a human agent response to the voice-to-text message is not received within a threshold period of time during the hold status.

3. The computer-implemented method of claim 1, wherein the hold status is associated with a hold indication, and wherein the hold indication is a binary computer telephony integration (CTI) hold indicator.

4. The computer-implemented method of claim 1, further comprising:
  storing details of the two-way voice communication in an interaction database;
  processing the details of the two-way voice communication in real-time to dynamically select an intent value for the two-way voice communication;
  process the voice message in real-time to update the intent value and to generate a hold status intent value separate from the intent value for the two-way voice communication; and
  transmit the intent value and the hold status intent value.

5. The computer-implemented method of claim 1, further comprising:
  streaming an audio message from the hold bot as a response to the voice-to-text message as part of the two-way voice communication; and
  interrupting the audio message during transmission when the hold status ends during streaming of the audio message.

6. The computer-implemented method of claim 1, further comprising:
  communicating an audio message generated by the hold bot as a response to the voice-to-text message as part of the two-way voice communication; and
  communicating audio interrupting the audio message during transmission when the hold status ends during streaming of the audio message.

7. A server computer comprising:
  memory; and
  one or more processors coupled to the memory and configured to perform operations comprising:
  establishing, by the server computer, a voice communication channel for a two-way voice communication session associated with an agent device and a user computing device;
  establishing, by the server computer, a text communication channel for text communications associated with the agent device and the user computing device;
  executing a hold bot;
  communicating a functionality message associated with a hold status, wherein when the functionality message is received by the user computing device, the user computing device generates a voice message;
  receiving the voice message during the hold status;
  processing the voice message using the hold bot, wherein the voice message is processed by determining a plurality of bot operations, querying the plurality of bot operations for confidence scores, and determining that a confidence score of a bot operation exceeds a threshold;
  generating a voice-to-text message when the confidence score exceeds the threshold;
  transmitting the voice-to-text message, wherein when two-way voice communication is in the hold status, the agent device receives the voice-to-text message and transmits a text message;

processing by the server computer, the text message, wherein the text message is processed by generating a real-time audio response to the voice message during the hold status; and transmitting the real-time audio response over the voice communication channel.

8. The server computer of claim 7, wherein the one or more processors are further configured for operations comprising:

processing the voice message using a natural language processing system of the hold bot to identify an intent associated with the voice message;

identifying a hold bot response system associated with the intent; and dynamically communicating instructions associated with the hold bot response system when a human agent response to the voice-to-text message is not received within a threshold period of time during the hold status.

9. The server computer of claim 7, wherein the hold status is associated with a hold indication, and wherein the hold indication is a binary computer telephony integration (CTI) hold indicator.

10. The server computer of claim 7, wherein the one or more processors are further configured for operations comprising:

storing details of the two-way voice communication in an interaction database;

processing the details of the two-way voice communication in real-time to dynamically select an intent value for the two-way voice communication;

processing the voice message in real-time to update the intent value and to generate a hold status intent value separate from the intent value for the two-way voice communication; and transmitting the intent value and the hold status intent value.

11. The server computer of claim 7, wherein the one or more processors are further configured for operations comprising:

streaming an audio message from the hold bot as a response to the voice-to-text message as part of the two-way voice communication; and interrupting the audio message during transmission when the hold status ends during streaming of the audio message.

12. The server computer of claim 7, wherein the one or more processors are further configured for operations comprising:

communicating an audio message generated by the hold bot as a response to the voice-to-text message as part of the two-way voice communication; and communicating audio interrupting the audio message during transmission when the hold status ends during streaming of the audio message.

13. A non-transitory computer readable medium comprising instructions that, when executed by one or more processors of a device, cause the device to perform operations comprising:

establishing, by a server computer, a voice communication channel for a two-way voice communication session associated with an agent device and a user computing device;

establishing, by the server computer, a text communication channel for text communications associated with the agent device and the user computing device;

executing a hold bot;

communicating a functionality message associated with a hold status, wherein when the functionality message is received by the user computing device, the user computing device generates a voice message;

receiving the voice message during the hold status;

processing the voice message using the hold bot, wherein the voice message is processed by determining a plurality of bot operations, querying the plurality of bot operations for confidence scores, and determining that a confidence score of a bot operation exceeds a threshold;

generating a voice-to-text message when the confidence score exceeds the threshold;

transmitting the voice-to-text message, wherein when two-way voice communication is in the hold status, the agent device receives the voice-to-text message and transmits a text message;

processing by the server computer the text message, wherein the text message is processed by generating a real-time audio response to the voice message during the hold status; and transmitting the real-time audio response over the voice communication channel.

14. The non-transitory computer readable medium of claim 13, wherein when executed by the one or more processors, the instructions further cause the device to perform operations comprising:

processing the voice message using a natural language processing system of the hold bot to identify an intent associated with the voice message;

identifying a hold bot response system associated with the intent; and dynamically communicating instructions associated with the hold bot response system when a human agent response to the voice-to-text message is not received within a threshold period of time during the hold status.

15. The non-transitory computer readable medium of claim 13, wherein the hold status is associated with a hold indication, and wherein the hold indication is a binary computer telephony integration (CTI) hold indicator.

16. The non-transitory computer readable medium of claim 13, wherein when executed by the one or more processors, the instructions further cause the device to perform operations comprising:

storing details of the two-way voice communication in an interaction database;

processing the details of the two-way voice communication in real-time to dynamically select an intent value for the two-way voice communication;

process the voice message in real-time to update the intent value and to generate a hold status intent value separate from the intent value for the two-way voice communication; and transmit the intent value and the hold status intent value.

17. The non-transitory computer readable medium of claim 13, wherein when executed by the one or more processors, the instructions further cause the device to perform operations comprising:

streaming an audio message from the hold bot as a response to the voice-to-text message as part of the two-way voice communication; and interrupting the audio message during transmission when the hold status ends during streaming of the audio message.

18. The non-transitory computer readable medium of claim 13, wherein when executed by the one or more processors, the instructions further cause the device to perform operations comprising:
  communicating an audio message generated by the hold bot as a response to the voice-to-text message as part of the two-way voice communication; and
  communicating audio interrupting the audio message during transmission when the hold status ends during streaming of the audio message.

* * * * *